United States Patent
Togawa

(10) Patent No.: US 7,770,177 B2
(45) Date of Patent: Aug. 3, 2010

(54) SYSTEM FOR MEMORY RECLAMATION BASED ON THREAD ENTRY AND RELEASE REQUEST TIMES

(75) Inventor: Atsushi Togawa, Tokyo (JP)

(73) Assignee: Sony Corporation, Tokyo (JP)

( * ) Notice: Subject to any disclaimer, the term of this patent is extended or adjusted under 35 U.S.C. 154(b) by 1370 days.

(21) Appl. No.: 11/217,494

(22) Filed: Sep. 2, 2005

(65) Prior Publication Data

US 2006/0070072 A1    Mar. 30, 2006

(30) Foreign Application Priority Data

Sep. 29, 2004  (JP)  ............................ P2004-283528
Jun. 10, 2005  (JP)  ............................ P2005-170420

(51) Int. Cl.
G06F 9/46       (2006.01)
G06F 13/00      (2006.01)

(52) U.S. Cl. ...................................... 718/108; 711/100

(58) Field of Classification Search ................. 718/102, 718/103, 107, 108; 711/100
See application file for complete search history.

(56) References Cited

U.S. PATENT DOCUMENTS

| 5,386,536 | A |   | 1/1995  | Courts et al. |
| 5,398,334 | A | * | 3/1995  | Topka et al. ................. 707/206 |
| 5,809,554 | A |   | 9/1998  | Benayon et al. |
| 5,918,049 | A |   | 6/1999  | Syväniemi |
| 6,058,460 | A | * | 5/2000  | Nakhimovsky ............. 711/153 |
| 6,145,061 | A | * | 11/2000 | Garcia et al. ................. 711/154 |
| 6,405,241 | B2 | * | 6/2002 | Gosling et al. .............. 709/203 |
| 6,505,229 | B1 | * | 1/2003 | Turner et al. ................ 718/107 |
| 6,708,197 | B1 | * | 3/2004 | Ryu et al. .................... 718/103 |
| 6,772,107 | B1 | * | 8/2004 | La Cascia et al. ............. 703/21 |

(Continued)

FOREIGN PATENT DOCUMENTS

EP          0 817 044            1/1998

(Continued)

OTHER PUBLICATIONS

European Search Report from European Patent Office dated Dec. 29, 2008, for Application No. 05785980.3-1243/1684179, PCT/JP2005017645, 10 pages.

(Continued)

*Primary Examiner*—Meng-Ai An
*Assistant Examiner*—Adam Lee
(74) *Attorney, Agent, or Firm*—Finnegan, Henderson, Farabow, Garrett & Dunner, L.L.P.

(57) ABSTRACT

An information processing apparatus includes a thread management unit managing thread information on a per data processing unit basis, and a memory area management unit managing a memory area. The thread management unit stores a thread list containing entry time information that is recorded on a per thread basis as function call time of an operating system from a data processing program. The memory area management unit stores a release queue containing release request time that is recorded on an area unit basis concerning an unreleased memory area in response to a release request, compares the release request time set in each queue component contained in the release queue with the oldest entry time of each queue component in the thread list during a memory area allocation process, and allocates the memory area to the queue component having the release request time set prior to the oldest entry time.

17 Claims, 17 Drawing Sheets

U.S. PATENT DOCUMENTS

| | | | |
|---|---|---|---|
| 6,816,956 B1 | 11/2004 | Benayon et al. | |
| 6,938,257 B1 * | 8/2005 | Rapp et al. | 719/311 |
| 7,035,990 B1 * | 4/2006 | Muhlbauer | 711/172 |
| 7,111,294 B2 * | 9/2006 | Steensgaard | 718/100 |
| 7,159,222 B1 * | 1/2007 | Forin et al. | 719/310 |
| 7,210,146 B2 * | 4/2007 | Hsieh | 718/103 |
| 7,426,720 B1 * | 9/2008 | Fresko | 717/140 |
| 7,640,549 B2 * | 12/2009 | Shen et al. | 719/313 |
| 2002/0095453 A1 | 7/2002 | Steensgaard | |
| 2004/0003188 A1 | 1/2004 | Rao | |
| 2004/0098720 A1 * | 5/2004 | Hooper | 718/102 |
| 2005/0229176 A1 * | 10/2005 | Findeisen | 718/100 |
| 2005/0235284 A1 * | 10/2005 | Kadashevich | 718/100 |
| 2006/0037020 A1 * | 2/2006 | Accapadi et al. | 718/102 |
| 2006/0277551 A1 * | 12/2006 | Accapadi et al. | 718/107 |

FOREIGN PATENT DOCUMENTS

| | | |
|---|---|---|
| EP | 1 376 354 | 1/2004 |
| JP | 11-073364 | 3/1999 |
| JP | 11/203193 | 7/1999 |
| JP | 2003-345612 | 5/2003 |
| WO | WO 94/03855 | 2/1994 |

OTHER PUBLICATIONS

Junko Tamada et al., "Bunsan Operating System Solelc ni Okeru System Call Shori no Bunsanka Hoshiki", Information Processing Society of Japan Kenkyu Hokoku, vol. 200e, No. 19, pp. 55 to 60, 2003-OS-92-8.

* cited by examiner

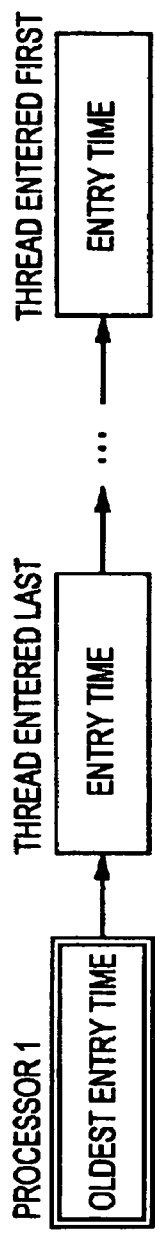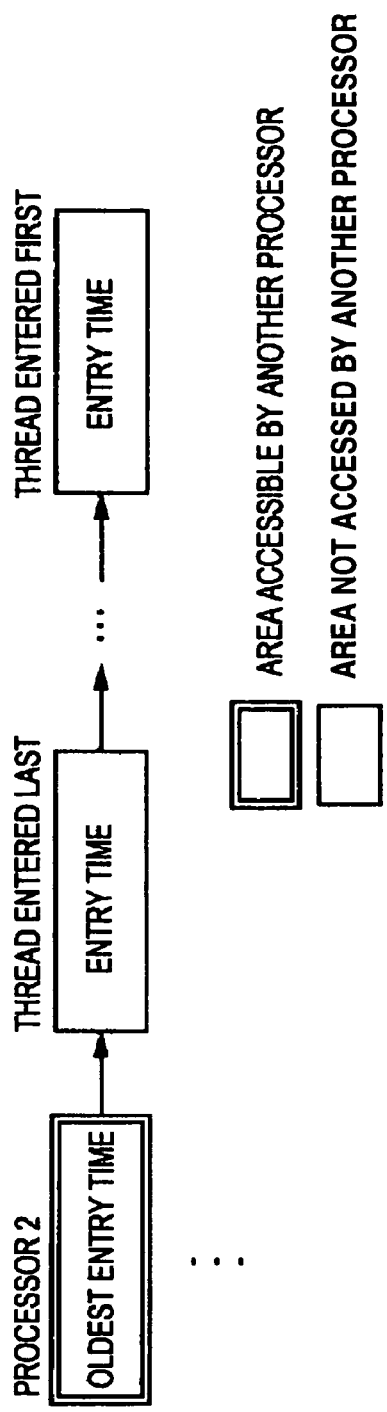
FIG. 6A
FIG. 6B

SYSTEM FOR MEMORY RECLAMATION BASED ON THREAD ENTRY AND RELEASE REQUEST TIMES

CROSS REFERENCES TO RELATED APPLICATIONS

The present invention contains subject matter related to Japanese Patent Application JP 2004-283528 filed in the Japanese Patent Office on Sep. 29, 2004, and Japanese Patent Application JP 2005-170420 filed in the Japanese Patent Office on Jun. 10, 2005, the entire contents of which are incorporated herein by reference.

BACKGROUND OF THE INVENTION

1. Field of the Invention

The present invention relates to an information processing apparatus, a memory area management method, and a computer program. More specifically, the present invention relates to an information processing apparatus, a memory area management method, and a computer program for allocating an appropriate memory area and performing a memory management process in an arrangement where a plurality of threads reference and update the memory area in parallel.

2. Description of the Related Art

In a multi operating system (OS) having a plurality of operating systems in a single system, each OS can execute respective process and hardware common to the system, such as a central processing unit (CPU) and a memory is successively switched in time sequence.

Scheduling of processes (tasks) of a plurality of operating systems is executed by a partition management software program, for example. If an OS($\alpha$) and an OS($\beta$) coexist in a single system with the process of OS($\alpha$) being a partition A and the process of OS($\beta$) being a partition B, the partition management software program determines the scheduling of the partition A and the partition B, and executes the process of the operating systems with the hardware resources allocated based on the determined scheduling.

Japanese Unexamined Patent Application Publication No. 2003-345612 discloses a task management technique of a multi OS system. According to the disclosure, tasks to be executed by a plurality of OS's are scheduled with a priority placed on a process having urgency.

When a plurality of programs are executed on at least one OS, a plurality of threads, each defined as a program execution unit, are present, and each thread uses a memory as a common resource. If an attempt is made to release, to another thread, a particular memory area currently being accessed by a given thread, an access error can be triggered. In known arts, error triggering is prevented by setting an interrupt disabled duration. The setting of the interrupt disabled duration leads to another problem such as a process delay.

SUMMARY OF THE INVENTION

It is desirable to provide an information processing apparatus, a memory area management method, and a computer program for allocating an appropriate memory area and performing a memory management process in a access-error free manner in an arrangement where a plurality of threads reference and update the memory area in parallel.

In accordance with one embodiment of the present invention, an information processing apparatus includes a thread management unit managing thread information on a per data processing unit basis, and a memory area management unit managing a memory area. The thread management unit stores, as thread management information, a thread list containing entry time information that is recorded on a per thread basis as function call time of an operating system from a data processing program. The memory area management unit stores, as memory area management information, a release queue containing release request time that is recorded on an area unit basis concerning an unreleased memory area in response to a release request, compares the release request time set in each queue component contained in the release queue with the oldest entry time of each queue component in the thread list during a memory area allocation process, and allocates the memory area to the queue component having the release request time set prior to the oldest entry time.

Preferably, the thread management unit generates a thread list corresponding to each of a plurality of processors, records the oldest entry time of entry time information set in thread information contained in the thread list, onto a header of each thread list, and manages the recorded information set as being referenced by another processor.

Preferably, the memory area management unit references all the oldest entry time information set in the header of the thread list corresponding to the processor managed by the thread management unit, selects the oldest of the oldest entry time from the oldest entry time information set in the headers of the thread list corresponding to all processors, compares the selected oldest entry time with the release request time set in each queue component contained in the release queue, and allocates a memory area to the queue component having the release request time set prior to the selected oldest entry time.

Preferably, the thread management unit records, on the header of the thread list and a list component, identification information of another list component, organizes the thread list as a list that permits each component to be successively acquired from the header, and updates the identification information set in one of the header and the list component during one of the entry of the thread and the retirement of the thread.

Preferably, the memory area management unit records, on the header of the release queue and a queue component, identification information of another queue component, organizes the release queue as a list that permits each queue component to be successively acquired from the header, and updates the identification information set in one of the header and the queue component during one of the setting of a new queue and the deleting of a queue.

Preferably, the memory area management unit performs the memory area management process on a per heap unit basis, the heap unit as a memory area having a finite size set corresponding to each processor, stores, as the memory area management information, a release queue containing release request time that is recorded on a heap unit basis concerning an unreleased heap in response to a release request, and allocates the memory area that is recorded on a per heap unit basis in the queue component contained in the release queue during a memory area allocation process.

Preferably, the memory area management unit examines a weak pointer chain, composed of a weak pointer referencing the memory area corresponding to the queue component contained in the release queue, and if no weak pointer is present in the weak pointer chain, breaks the queue component from the release queue, and releases the memory area corresponding to the queue component.

Preferably, the memory area management unit examines a retirement flag of the memory area contained in a weak pointer chain, composed of a weak pointer referencing the memory area corresponding to the queue component contained in the release queue and the memory area containing a reference area of the weak pointer, and if the retirement flag indicates a retired status, breaks the queue component from the release queue, and releases the memory area corresponding to the queue component.

In accordance with another embodiment of the present invention, a method of managing a memory area includes steps of managing a thread by generating and updating a thread list composed of thread information containing entry time information that is recorded on a per thread basis as function call time of an operating system from a data processing program, managing a memory area by generating and updating, as memory area management information, a release queue containing release request time that is recorded on a per area basis concerning an unreleased memory area in response to a release request, and allocating the memory area to the queue component having the entry request time set prior to the oldest entry time, by comparing the release request time set in each queue component contained in the release queue with the oldest entry time of each queue component in the thread list during a memory area allocation process.

Preferably, the thread management step includes generating the thread list corresponding to each of a plurality of processors, recording the oldest entry time of entry time information set in thread information contained in the thread list, onto a header of each thread list, and managing the recorded information set as being referenced by another processor.

Preferably, the memory area management step includes referencing all the oldest entry time information set in the header of the thread list corresponding to a processor, selecting the oldest of the oldest entry time from the oldest entry time information set in the headers of the thread list corresponding to all processors, comparing the selected oldest entry time with the release request time set in each queue component contained in the release queue, and allocating a memory area to the queue component having the release request time set prior to the selected oldest entry time.

Preferably, the thread management step includes recording, on the header of the thread list and a list component, identification information of another list component, organizing the thread list as a list that permits each component to be successively acquired from the header, and updating the identification information set in one of the header and the list component during one of the entry of the thread and the retirement of the thread.

Preferably, the memory area management step includes recording, on the header of the release queue and a queue component, identification information of another queue component, organizing the release queue as a list that permits each queue component to be successively acquired from the header, and updating the identification information set in one of the header and the queue component during one of the setting of a new queue and the deleting of a queue.

Preferably, the memory area management step includes performing the memory area management process on a per heap unit basis, the heap unit as a memory area having a finite size set corresponding to each processor, and storing, as the memory area management information, a release queue containing release request time that is recorded on a heap unit basis concerning an unreleased heap in response to a release request, and the memory area allocation step includes allocating the memory area that is recorded on a per heap unit basis in the queue component contained in the release queue.

Preferably, the memory area management step includes examining a weak pointer chain, composed of a weak pointer referencing the memory area corresponding to the queue component contained in the release queue, and if no weak pointer is present in the weak pointer chain, breaking the queue component from the release queue, and releasing the memory area corresponding to the queue component.

The memory area management step includes examining a retirement flag of the memory area contained in a weak pointer chain, composed of a weak pointer referencing the memory area corresponding to the queue component contained in the release queue and the memory area containing a reference area of the weak pointer, and if the retirement flag indicates a retired status, breaking the queue component from the release queue, and releases the memory area corresponding to the queue component.

In accordance with yet another embodiment of the present invention, a computer program for managing a memory area, includes managing a thread by generating and updating a thread list composed of thread information containing entry time information that is recorded on a per thread basis as function call time of an operating system from a data processing program, managing a memory area by generating and updating, as memory area management information, a release queue containing release request time that is recorded on a per area basis concerning an unreleased memory area in response to a release request, and allocating the memory area to the queue component having the entry request time set prior to the oldest entry time, by comparing the release request time set in each queue component contained in the release queue with the oldest entry time of each queue component in the thread list during a memory area allocation process.

The computer program of one embodiment of the present invention is provided, to a general-purpose computer system executing a variety of program code, in a computer-readable storage medium, such as a compact disk (CD), a floppy disk (FD), or a magneto-optic disk (MO), or a communication medium such as network. By providing the computer program in a computer readable manner, the computer system performs process responsive to the computer program.

These and other features, and advantages of the present invention will become obvious from the following description of the present invention and the accompanying drawings. In the context of the description of the present invention, the system refers to a logical set of a plurality of apparatuses, and is not limited to an apparatus that houses elements within the same casing.

In accordance with embodiments of the present invention, the thread list of the thread information containing the entry time information that is recorded on a per thread basis as a data processing unit is stored as the thread management information, and the release queue containing the release request time that is recorded on an area unit basis concerning an unreleased memory area in response to a release request is stored as the memory area management information. The release request time set in each queue component contained in the release queue is compared with the oldest entry time of each queue component in the thread list during a memory area allocation process. The memory allocation process is performed on only the memory area corresponding to the queue component with the release request time set prior to the oldest entry time. Only a memory area that is not an access target in all threads is reliably selected and subjected to the allocation process. The memory area allocation process is safely preformed in a manner free from the generation of access error in each thread.

BRIEF DESCRIPTION OF THE DRAWINGS

FIGS. 6A and 6B illustrate information managed by a thread management unit in the information processing apparatus of the embodiment of the present invention;

DESCRIPTION OF THE PREFERRED EMBODIMENTS

Figure 1:
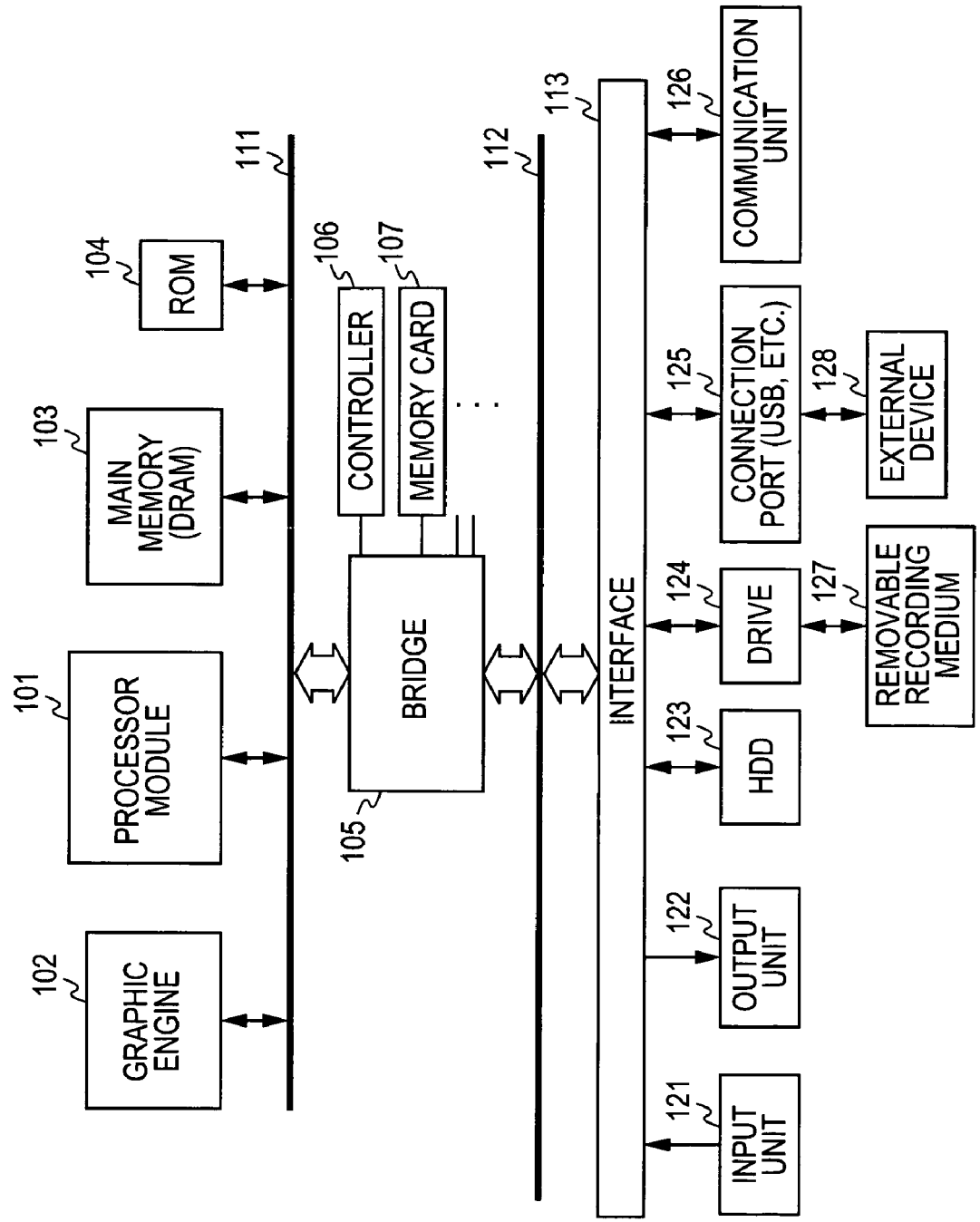
FIG. 1 is a block diagram of an information processing apparatus in accordance with one embodiment of the present invention.

An information processing apparatus, a memory area management method, and a computer program of embodiments of the present invention are described below with reference to the drawings.

The hardware structure of the information processing apparatus of one embodiment of the present invention is described below with reference to FIG. 1. A processor module 101 includes a plurality of processing units, and processes data in accordance with a variety of programs stored in a read-only memory (ROM) 104 and a hard disk drive (HDD) 123, including operating systems (OS's) and application programs running on the OS. The processor module 101 will be described later with reference to FIG. 2.

In response to a command input via the processor module 101, a graphic engine 102 generates data to be displayed on a screen of a display forming an output unit 122, for example, performs a three-dimensional graphic drawing process. A main memory (DRAM) 103 stores the program executed by the processor module 101 and parameters that vary in the course of execution of the program. These elements are interconnected via a host bus 111 including a CPU bus.

The host bus 111 is connected to an external bus 112, such as a peripheral component interconnect/interface (PCI) bus via a bridge 105. The bridge 105 controls data inputting and outputting between the host bus 111, the external bus 112, a controller 106, a memory card 107, and other devices.

An input unit 121 inputs information to an input device, such as a keyboard and a pointing device, operated by a user. An output unit 122 includes an image output unit, such as one of a liquid-crystal display and a cathode ray tube (CRT), and an audio output device such as a loudspeaker.

The hard disk drive (HDD) 123 drives a hard disk loaded therewithin, thereby recording or playing back a program to be executed by the processor module 101 and information.

A drive 124 reads data and programs stored in a loaded removable recording medium 127, such as a magnetic disk, an optical disk, a magneto-optic disk, a semiconductor memory, or the like, and supplies the data and the programs to a main memory (DRAM) 103 via an interface 113, the external bus 112, the bridge 105, and the host bus 111.

A connection port 125 connects to an external device 128, and may include a universal serial bus (USB), an IEEE (Institute of Electrical and Electronics Engineers) 1394 bus, or the like. The connection port 125 is connected to the processor module 101 via the interface 113, the external bus 112, the bridge 105, and the host bus 111. A communication unit 126, connected to a network, transmits data supplied from the HDD 123 or the like, and receives data from the outside.

Figure 2:
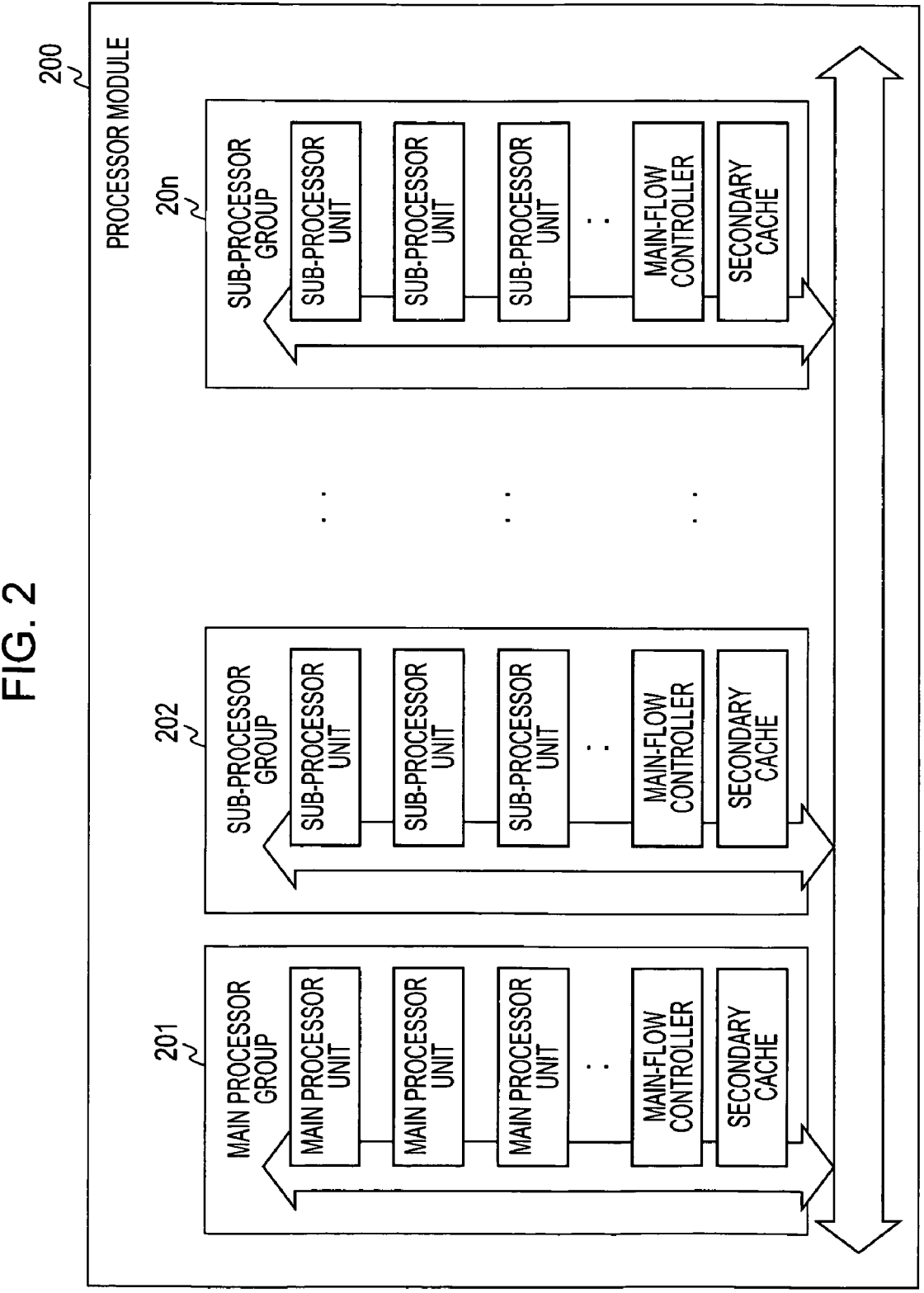
FIG. 2 illustrates a processor module in the information processing apparatus of the embodiment of the present invention.

The structure of the processor module 101 is described below with reference to FIG. 2. As shown, a processor module 200 includes a main processor group 201 including a plurality of main processor units, and a plurality of sub-processor groups 202 thorough 20n, each including a plurality of sub-processor units. Each group further includes a main controller and a secondary cache. The processor groups 201 through 20n, each including eight processor units, for example, are connected via one of a cross-bar architecture and a packet exchange network. In response to a command of the main processor of the main processor group 201, at least one sub-processor in the plurality of sub-processor groups 202 through 20n is selected to perform a predetermined program.

The main-flow controller in each processor group controls data inputting and data outputting to the main memory 103 of FIG. 1. The secondary cache serves as a memory area for process data in each processor group.

As previously discussed, when a plurality of programs run on at least one operating system (OS), a plurality of threads defined by a program execution unit are present, and a memory as a resource common to the threads, for example, the main memory (DRAM) of FIG. 1 is used. If one thread attempts to perform a release process to a memory area while the memory area is being accessed by another thread, an access error is triggered. In known arts, the triggering of the access error is prevented by setting an interrupt disabled period, but the setting of the interrupt disabled period leads to a process delay.

Figure 3:
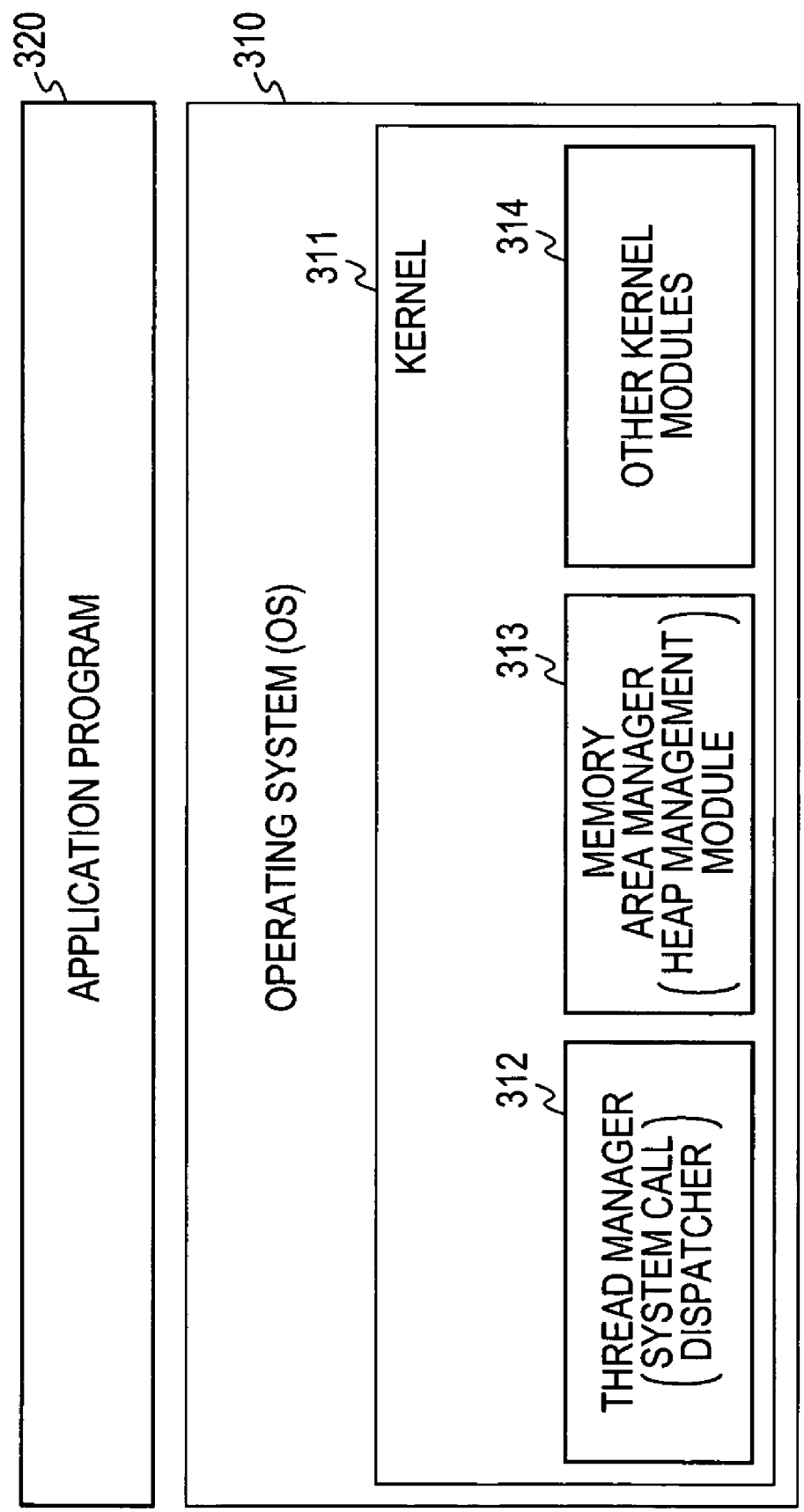
FIG. 3 illustrates the software structure of the information processing apparatus of the embodiment of the present invention.

In accordance with embodiments of the present invention, efficient data processing is performed by executing an appropriate memory management responsive to a thread. Referring to FIG. 3, a memory allocation and release process appropriate for the thread is discussed in detail below.

FIG. 3 illustrates a software stack in the information processing apparatus of one embodiment of the present invention. The software stack is composed of an operating system (OS) 310, and an application program 320 executed on the OS 310. The OS 310 includes a kernel 311 for executing multitask control, file system management, memory management, and an input and output process.

The kernel 311 includes a thread manager (system call dispatcher) 312, a memory area manager (heap management module) 313 for executing management of a memory area, and the other kernel module 314.

In an object-oriented memory management process, a resource is handled as an object, and the memory management is performed based on the memory area having a finite size called a heap. The memory area manager (heap management module) 313 manages allocation of the object to the heap. The memory area manager 313 efficiently allocates the memory area (heap) to each thread while releasing the finite heap.

Figure 4:
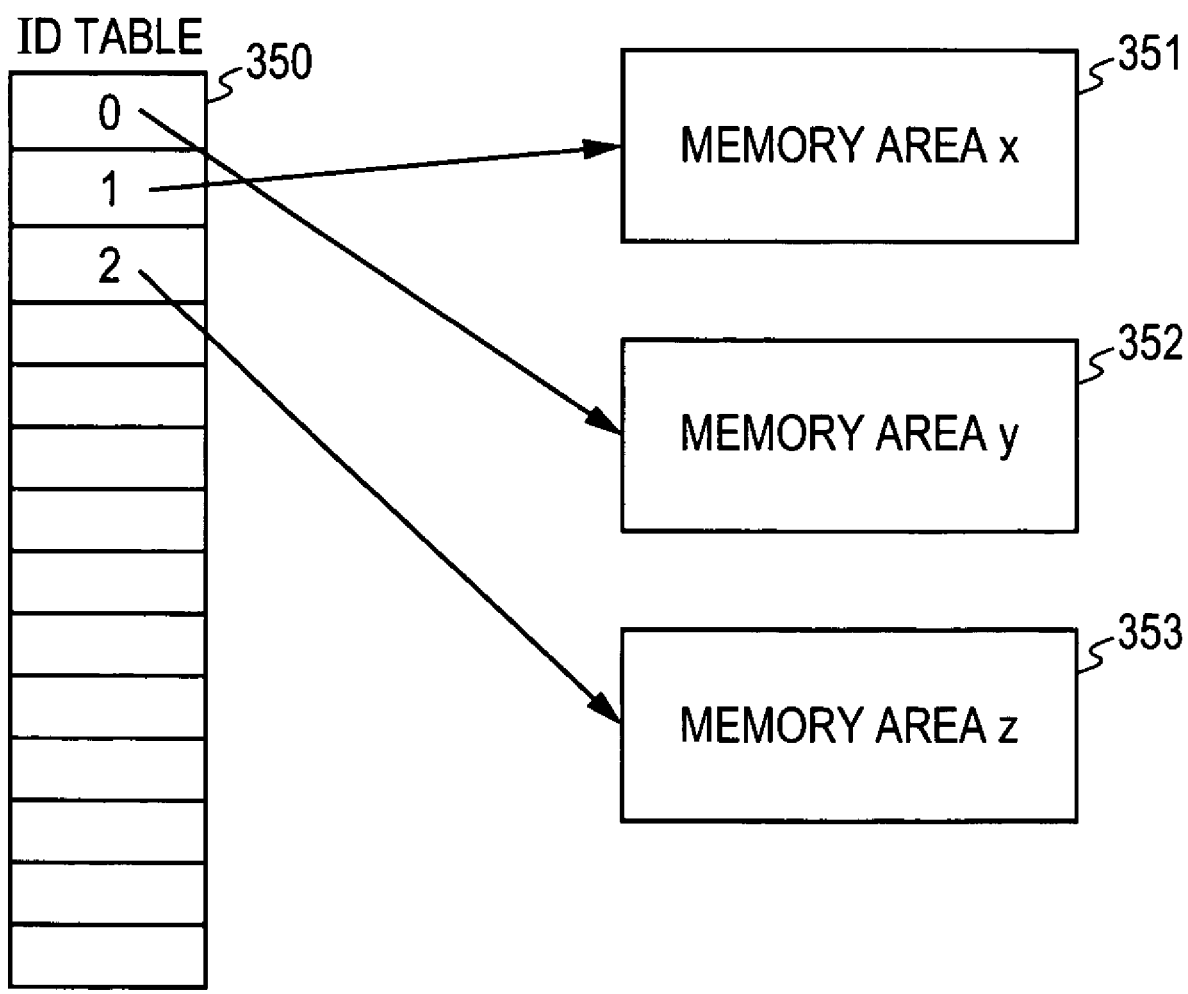
FIG. 4 illustrates an access process to a typical memory area.

A typical memory allocation process for allocating the memory area to the thread is described below with reference to FIGS. 4 and 5. A memory area x351, a memory area y352, and a memory area z353 set as objects in FIG. 4 are accessible via an identification (ID) table 350 set as pointer information to the objects, by a thread executing program.

The kernel of the OS locks the ID table 350 to prevent a second thread from accessing the memory area that is currently being accessed by a first thread in order to avoid accessing from the second thread. The second thread thus cannot access memory until the ID table 350 is unlocked, and processing must wait.

Figure 5:
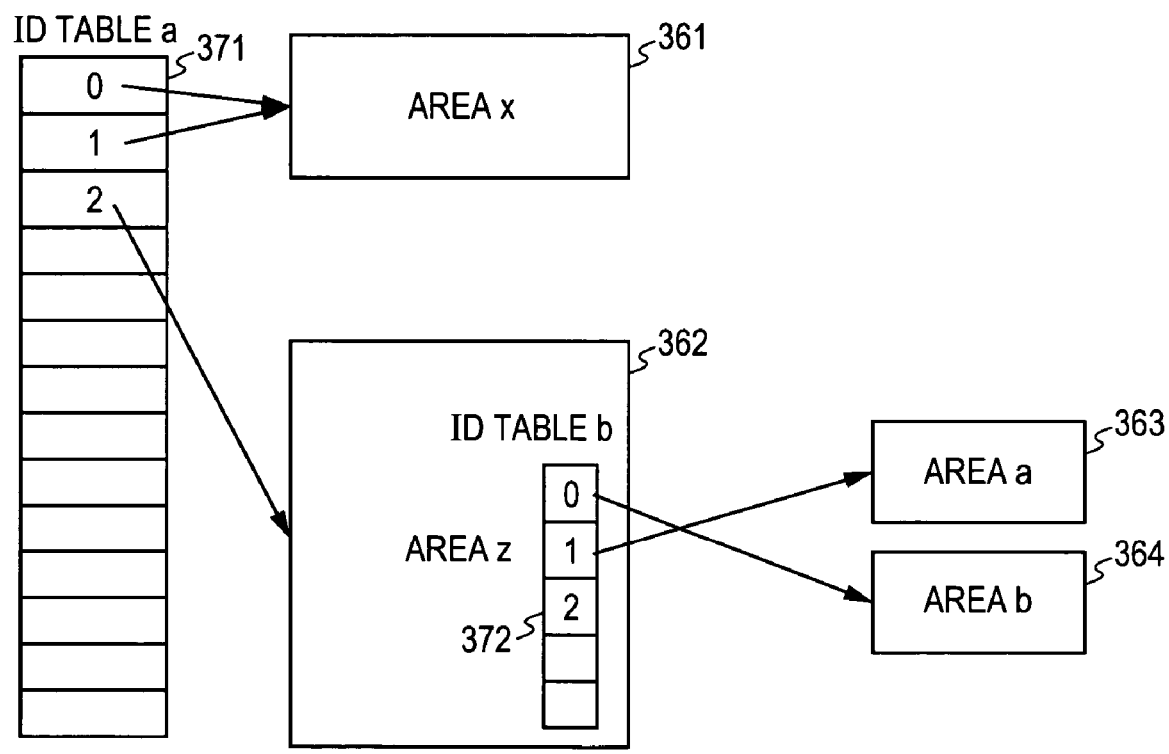
FIG. 5 illustrates an access process to a typical memory area.

FIG. 5 illustrates the ID table having a two-layered structure. An ID table a371 is used to access to a memory area x361 and a memory area z362, etc., as objects. The memory area z362 in turn contain a second ID table b372, and permits accessing to a memory area a363 and a memory area b364 by applying the second ID table b 372. In this way, the kernel of the OS blocks the ID table to prevent the other thread from accessing the memory area. The other thread thus cannot perform memory accessing until the lock is released, and processing is thus delayed.

Even if an individual area, such as one of the memory area a363 and the memory area b364 of FIG. 5, is not used, the kernel locks the ID table a371 in the memory management process during the use of the memory area x361. As a result, an available memory area cannot be effectively used.

Embodiments of the present invention overcome such an inefficient use of memory, thereby permitting efficient memory allocation to each thread. Such a process is carried out by the thread manager (system call dispatcher) 312 and a memory area manager (heap management module) 313. The process is described in detail below.

Figure 7:
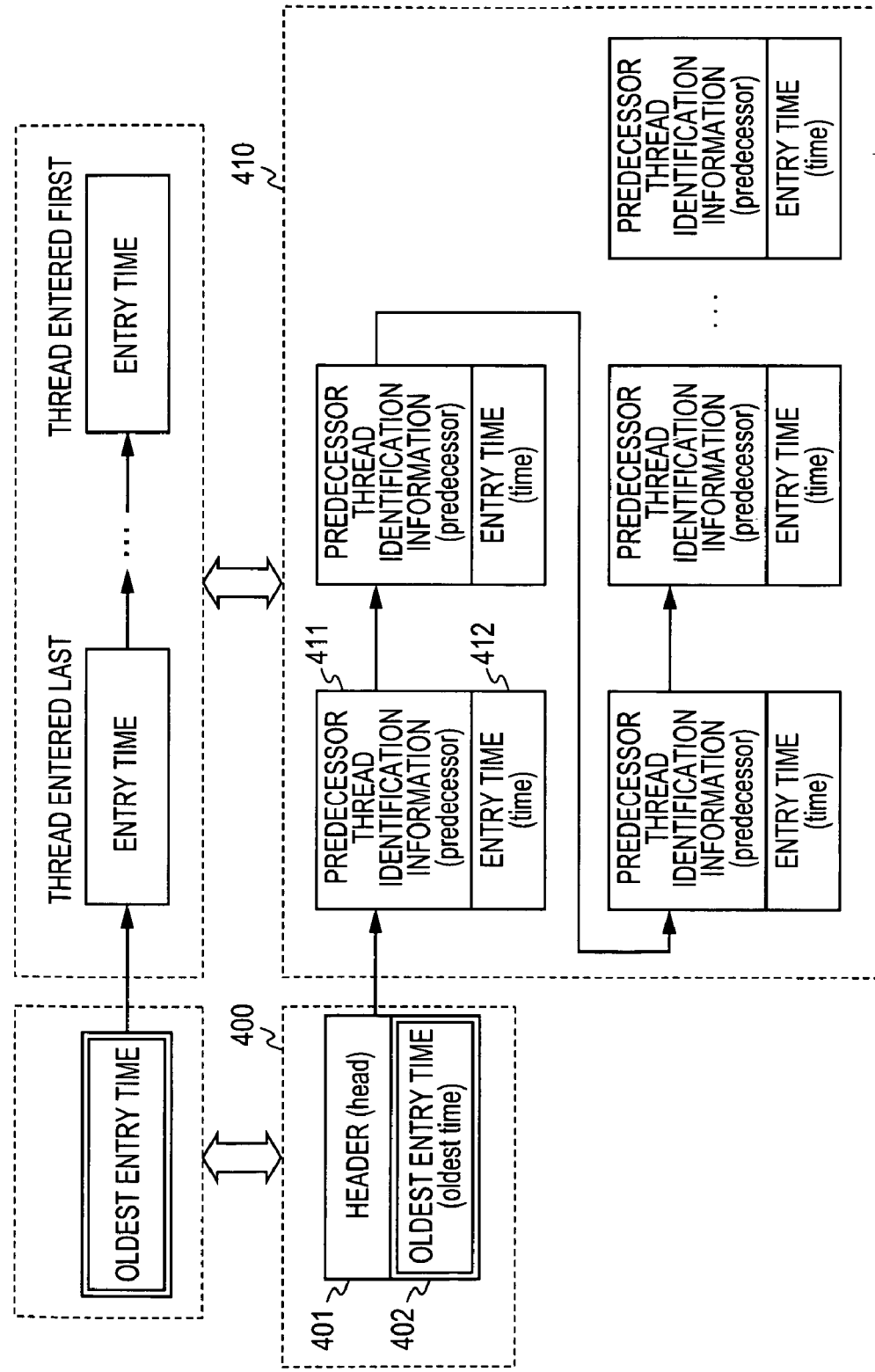
FIG. 7 illustrates in detail information managed by the thread management unit in the information processing apparatus of the embodiment of the present invention.

The process of the thread manager 312 is described below with reference to FIGS. 6 and 7.

The thread manager 312 executes the threads for each of processors, provided in the information processing apparatus for executing the thread. The thread manager 312 holds thread management information on a per processor basis.

The thread management information is described below with reference to FIGS. 6A and 6B and 7. FIGS. 6A and 6B illustrate a thread list forming the thread management information on a per processor basis. A thread list corresponding to only a processor 1 and a processor 2 is shown. The thread manager 312 generates and holds the thread list as management information corresponding to the processor executing the thread.

FIG. 6A illustrates the thread list as the thread management information of the processor 1. The thread list is composed of concatenation data of entry time information of individual threads running in the hypervisor in the processor 1, and the oldest entry time information. FIG. 6B illustrates the thread list as the thread management information of the processor 2. The thread list is composed of concatenation data of entry time information of individual threads running in the hypervisor in the processor 2, and the oldest entry time information. The entry time information of the thread refers to function call time of an operating system from an application program as a variety of data processing programs. In each list, the oldest entry time information can be referenced by another processor. As previously discussed, the thread is a data processing execution unit corresponding to the logical partition. To execute the thread, a variety of resources, such as processors and memory areas, are reserved.

When a processor for executing the thread is determined, the available memory area is allocated in the thread of the processor. The thread manager 312 distributes threads among processors, generates a thread list as thread information with memory area allocation, and manages the threads.

The hypervisor is a privileged layer arranged between the logical partition and hardware, and manages the logical partition. The thread is a process executed by the logical partition. The thread, discussed as being executed by the processor module with reference to FIGS. 1 and 2, is executed by the logical partition. Each logical partition is allocated hardware resources (including, as computing resources, a main processor, a sub-processor, a memory, devices, etc.), and executes processes using the resources allocated thereto.

The thread manager 312 records and holds the entry time information related to the thread identified by the hypervisor arranged between the logical partition and the hardware.

The thread list information held by the thread manager 312 is described in detail with reference to FIG. 7. As described with reference to FIGS. 6A and 6B, the thread list as the thread management information for each processor includes the concatenation data of the entry time information of each thread, and the oldest entry time information. The management information includes a variable 400 set on a per processor basis and a variable 410 set on a per thread basis as shown in FIG. 7. As previously discussed, the entry time information of the thread corresponds to the function call time of the operating system from the application program as a variety of data processing programs.

The variable 400 set on a per processor basis includes a header (head) 401, and the oldest entry time (oldest_time) 402. The header 401 contains pointer information to a front element of the list. The oldest entry time 402 holds the oldest of the entry time information in elements set in the list. The list is appropriately updated in response to the entry of the thread, and the retirement of the thread. If the oldest entry time from among the elements forming the list is updated in the update process, the oldest entry time 402 is also updated together. In view of the efficiency of access process, the header 401 and the oldest entry time 402 are stored in different cache lines. The cache line storing the header 401 store variables that are free from referencing from another processor. The cache line holding the oldest entry time 402 can be referenced by another processor.

The variable 410 set on a per thread basis includes predecessor thread identification information (predecessor) 411 and entry time information (time) 412. The predecessor thread identification information 411 is an identifier (for example, a pointer) of preceding thread information. As shown, the list contains thread information in the order from the thread having the latest entry time to the thread having the oldest entry time. Each of the thread information is identified by the predecessor thread identification information 411, and is then acquired. The thread information of the front of the list is identified by the header 401 of the oldest entry information. Since the end thread information has no preceding thread, the "predecessor thread identification information (predecessor)=null" is set. The entry time 412 indicates entry time of each thread.

Figure 8:
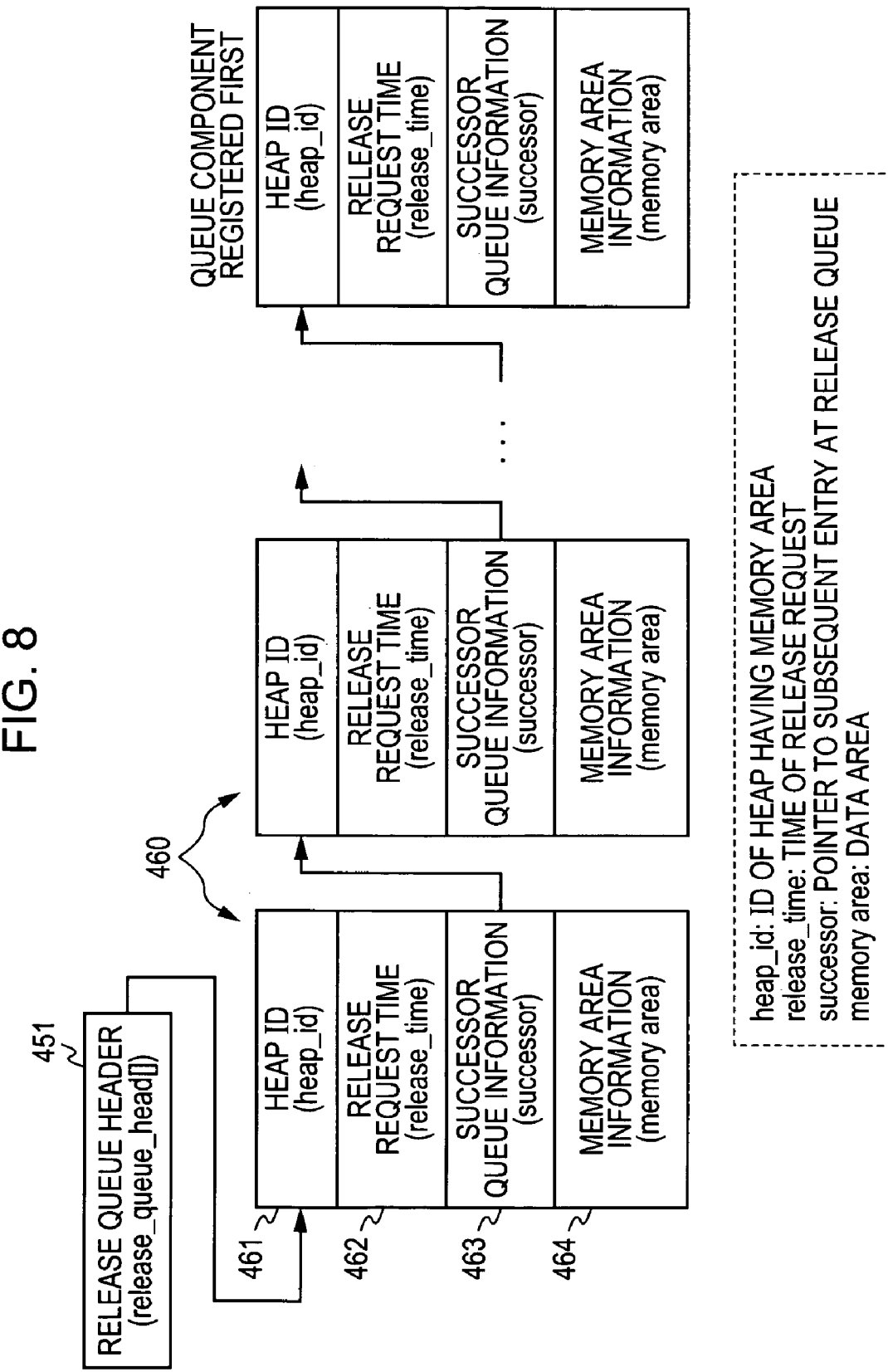
FIG. 8 illustrates information managed by a memory area management unit in the information processing apparatus of the embodiment of the present invention.

Referring to FIG. 8, information managed by the memory area manager 313 is described below with reference to FIG. 8. As previously discussed, in the object-oriented memory management process, the resource is handled as an object, and the memory management is performed based on the memory area having a finite size called heap. The element managing the allocation of the object to the heap is the memory area manager 313. The memory area manager 313 efficiently allocates the memory area (heap) to each thread requesting heap while appropriately releasing the finite heap.

The memory area manager 313 holds heap management information set on a per processor basis. In other words, the number of heap management information units equals the number of processors. The heap management information contains a release queue of FIG. 8. The release queue is information of a memory area (heap), which is not yet released although the release thereof has been requested.

As shown in FIG. 8, the structure of the release queue held by the memory area manager 313 is discussed. The release queue of FIG. 8 is set as the heap management information set on a per processor basis. The release queues of FIG. 8 are individually arranged for respective processors.

The release queue is set as a concatenation list of header information (release_queue_head) 451 and a queue component 460. The queue component 461 contains a heap identifier (heap_id) 461, release request time (release_time) 462, successor queue information (successor) 463, and memory area information 464.

The heap identifier 461 is heap identification information set as a memory area on a per processor basis. The release request time 462 indicates request time of heap, namely, time at which the thread issues a use request of heap. The subsequent queue information 463 is a pointer to a subsequent queue in the release queue. The memory area information 464 is access information to the memory area available to the processor corresponding to the heap identifier 461.

The header information 451 contains the heap identifier (heap_id), and is set as information containing the pointer information of the front queue. As shown, all queue components are acquired by tracing the successor queue information 463 of each queue component from the header information 451.

Available processors are allocated to each thread in a resource allocation process, a heap area corresponding to each processor is identified, and the thread is ready to be executed. At this point of time, a queue component is set in the release queue corresponding to the allocated processor.

In accordance with one embodiment of the present invention, the efficient memory allocation to the thread is performed under the control of the thread manager 312 and the memory area manager 313 in the kernel 311. The process of the thread manager 312 and the memory area manager 313 in the kernel 311 is discussed with reference to FIG. 9.

The process of the thread manager 312 is described below with reference to FIGS. 9 through 12. The thread manager 312 executes the entry process of the thread information to and the retirement process of the thread information from the thread list described with reference to FIGS. 6A and 6B, and 7.

The entry process of the thread information is performed immediately after the application program calls a function of the OS. More specifically, the thread for data processing using the processor is generated when the application program calls the function of the OS. The thread is set on a standby state waiting for the release of the memory area. The thread information corresponding to the thread is set as the management information of the thread manager 312.

The retirement process of the thread information is performed immediately before control is handed over to the application program with a system call process completed by the OS. More specifically, the memory allocation process is completed by the OS, and control is handed over to the application program. The thread can be executed using the processor and memory area allocated by the OS. When the control is returned to the application program with the system call completed by the OS, the memory area (heap) is allocated to the thread. The thread manager 312 managing the thread information in the memory area on the standby state deletes the thread information from the thread list. This process is the retirement process.

Figure 9:
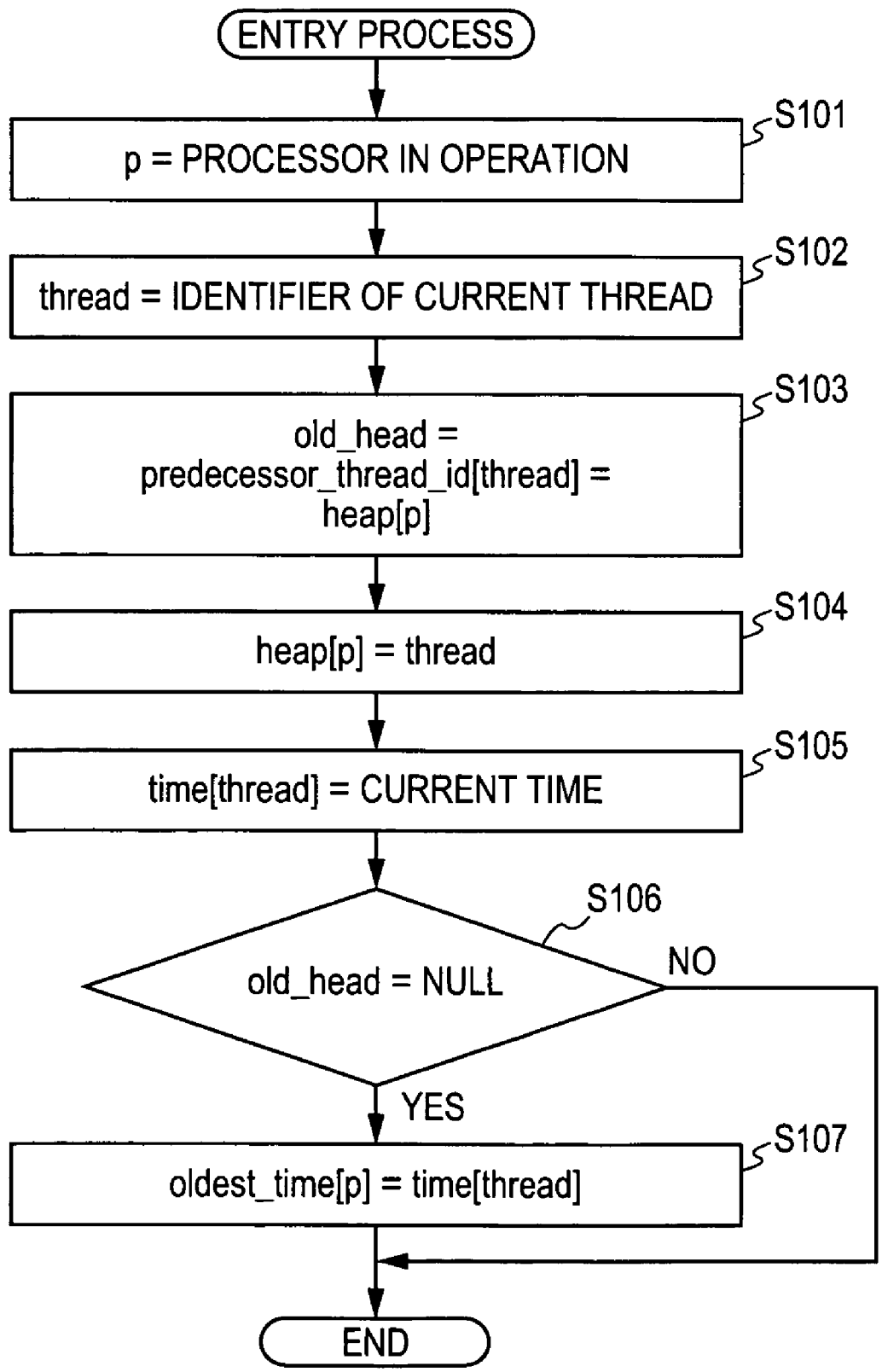
FIG. 9 is a flowchart illustrating the sequence of a thread information entry process executed by the thread management unit in the information processing apparatus of the embodiment of the present invention.
Figure 10A:
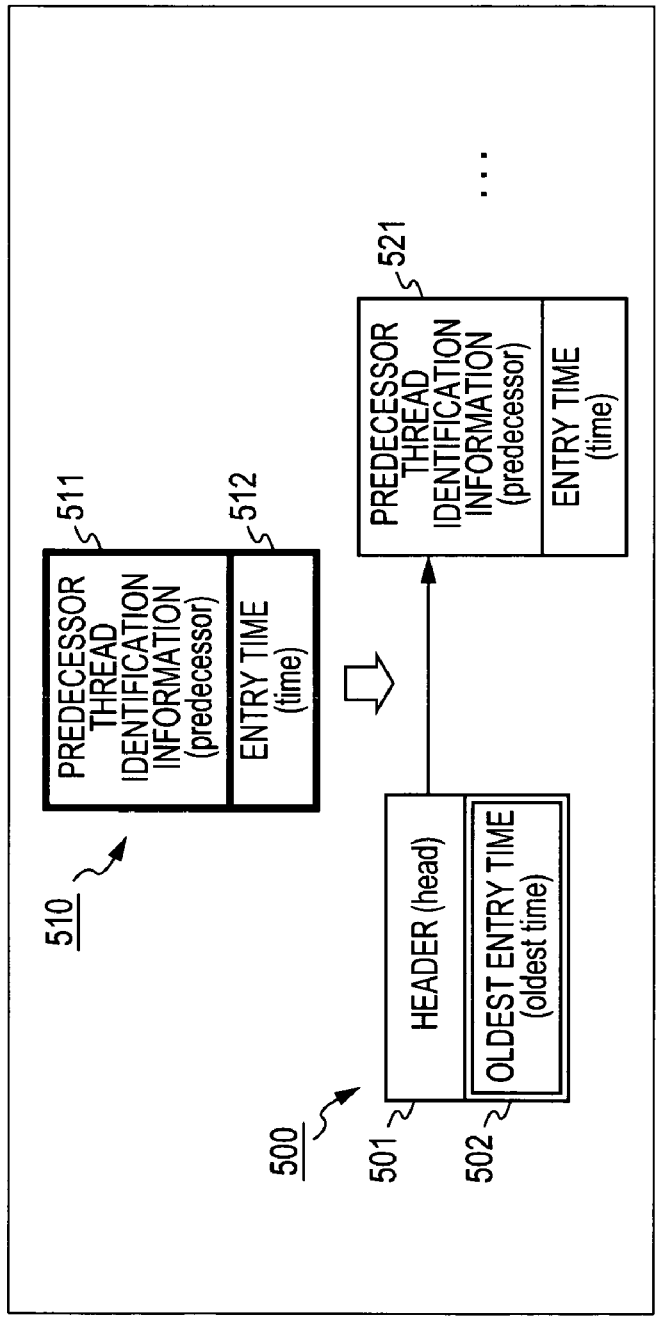
FIGS. 10A and 10B illustrate in detail the thread information entry process executed by the thread management unit in the information processing apparatus of the embodiment of the present invention.
Figure 10B:
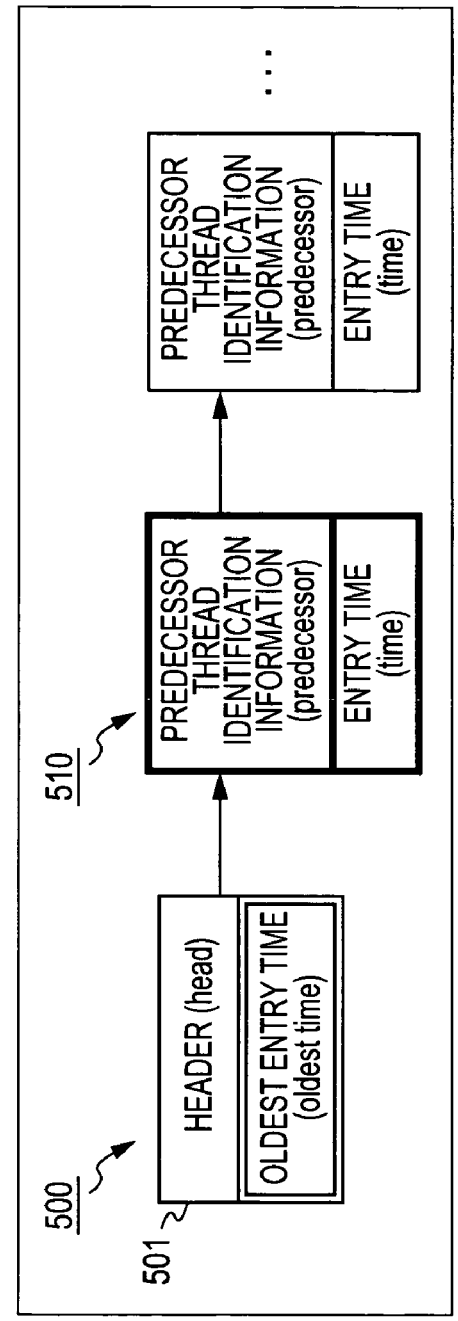

The thread entry process sequence is described below with reference to a flowchart of FIG. 9 and diagrams of FIGS. 10A and 10B. The thread entry process is carried out to add new thread information 510 to the thread list as shown in FIGS. 10A and 10B. An addition location of the new thread information 510 of FIG. 10A is indicated by header information 501 contained in processor related data 500. In this addition process, a thread list of FIG. 10B is constructed. When the new thread information 510 is added, a variety of information in the existing thread list needs to be updated. FIG. 9 is a flowchart of the update process.

Each step of the flowchart of FIG. 9 is described below. A series of steps of FIG. 9 is carried out in an interrupt disabled state. In step S101, a variable p is set as an identifier of the processor performing the entry process. As previously discussed, the thread manager 312 manages the thread list on a per processor basis. To identify the thread list for executing the thread entry process, the variable [p] is set as an identifier of a processor executing the entry process. In step S102, a variable [thread] is set as an identifier of a processor executing the retirement process. More specifically, the variable thread is set as the identifier of the thread 510 of FIG. 10.

In step S103, a variable [old_head]=the predecessor thread identification information "predecessor_thread_id [thread]= head[p] is set.

This process step means that a value [head[p]] set for the header 501 of FIG. 10A is set for the preceding thread information 511 of the new thread information 510 and that the preceding thread information 511 is set for a variable [old_head].

In step S104, the variable [head[p]]=thread is set.

This process step means that the value set for the header 501 of FIG. 10A is set as an identifier of the new thread information 510 of an entering thread.

In step S105, present time is set for a variable time [thread]. This process step means that the present time is set for entry time information 512 of the new thread information 510 of FIG. 10A.

It is determined in step S106 whether the variable [old_head] set in step S103 is null. The variable [old_head] set in step S103 is information that is set for the header 501 of FIG. 10A prior to the entry process. If null is set for the header 501 of FIG. 10A, no thread information is present in the thread list, and the new thread information 510 of FIGS. 10A and 10B is only thread information set for the thread list. In step S105, the oldest entry time 502 contained in the processor-related data 500 of FIG. 10A is set for the time information set for entry time information 512 of the entering thread, namely, time [thread].

If the variable [old_head] is not null, thread information having entry time older than the new thread information 510 is present in the thread list. Processing is thus completed without updating the oldest entry time 502 contained the processor-related data 500.

This entry process results in the thread list in which the new thread information 510 of FIG. 10B is set at a location accessible by the header 501 of the processor-related data 500.

Figure 11:
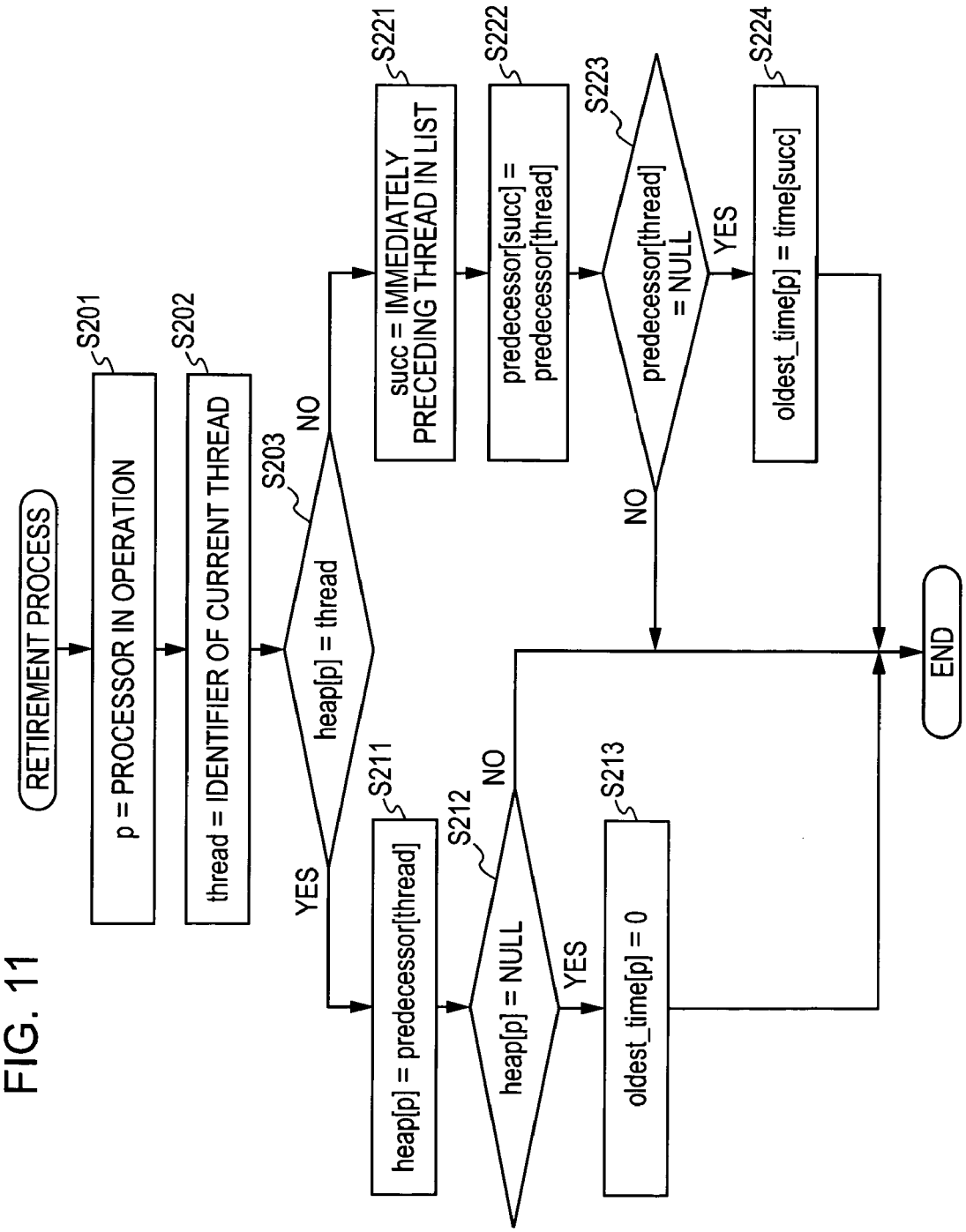
FIG. 11 is a flowchart illustrating the sequence of a thread information retirement process executed by the thread management unit in the information processing apparatus of the embodiment of the present invention.
Figure 12A:
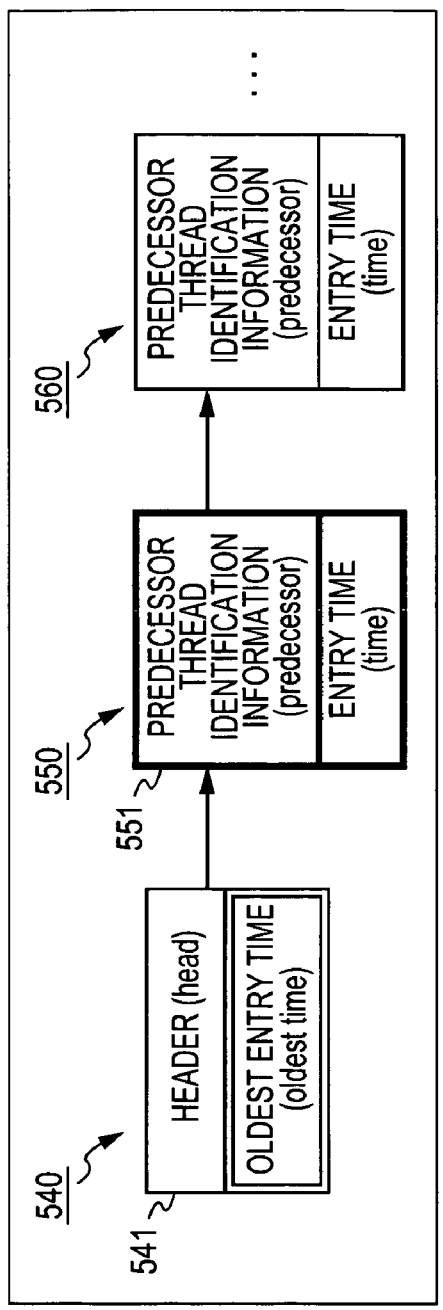
FIGS. 12A and 12B illustrate in detail the sequence of a thread information retirement process executed by the thread management unit in the information processing apparatus of the embodiment of the present invention.
Figure 12B:
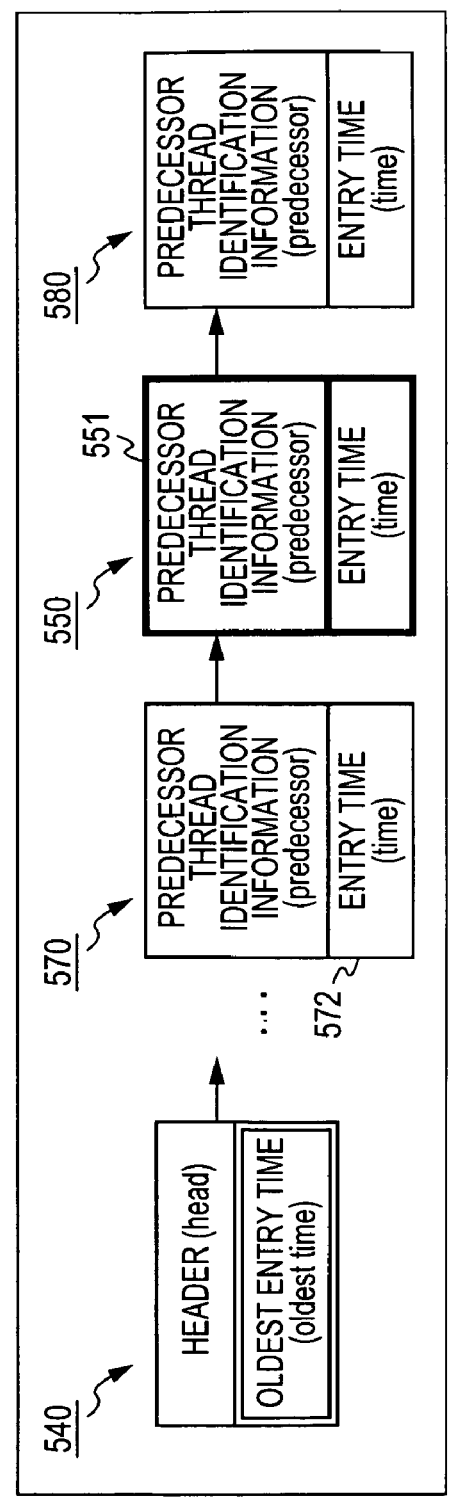

Referring to FIGS. 11 and 12A and 12B, the thread retirement process executed by the thread manager 312 is described in detail. The thread retirement process is carried out immediately before control is returned to the application program subsequent to the completion of the system call process of the OS. When control is returned to the application program after the memory allocation process completed by the OS, the thread can be executed using the processor and the memory area allocated by the OS. When control is returned to the application program after the memory allocation process completed by the OS, the memory area (heap) is allocated to the thread. The thread manager 312 on the standby state managing the thread information deletes the thread information from the thread list. The thread retirement process has been discussed.

The process sequence of the retirement process is described below with reference to FIG. 11. A series of steps of FIG. 11 is carried out in an interrupt disabled state. Steps S201 and 202 of FIG. 11 are performed to determine the processor and the thread executing the retirement process. In step S201, a variable [p] is set for an identifier executing the retirement process. In step S202, a variable [thread] is set for an identifier of a current thread executing the retirement process.

In step S203, the location of the thread to be processed in the retirement process is determined. More specifically, whether to perform steps S211 through S213 or steps S221 through S224 is determined depending on the location of the thread information for the retirement process in the thread list. In other words, the process becomes different depending on whether the thread information to be retired is located as in FIG. 12A or FIG. 12B.

As shown in FIG. 12A, thread information 550 to be processed in the retirement process is located at the front end of the thread list, namely, at the location specified by a header 541 of processor-related data 540. Header information [head [p]] of the header 541 of the processor-related data 540 is set as identification information [thread] of thread information 550 to be retired. The answer to the determination in step S203 is yes, and steps S211 through S213 are thus executed.

As shown in FIG. 12B, the thread information 550 to be processed in the retirement process is at a location other than the front of the thread list. In this case, the header information [head[p]] of the header 541 of the processor-related data 540 is not set as the identification information [thread] of the thread information 550 to be processed in the retirement process. The answer to the determination in step S203 is no. Processing proceeds to steps S221 through S224.

As shown in FIG. 12A, the thread information 550 is now at the front of the thread list. In step S211, header information [head[p]] of the header 541 of the processor-related data 540 is set for preceding thread information [predecessor [thread]] 551 set for the thread information 550 to be processed in the retirement process. As shown in FIG. 12A, this process step corresponds to the setting of information specifying thread information 560 to the header 541 of the processor-related data 540. If no preceding thread is contained in the thread information 550 to be processed in the retirement process, [null] is set for the predecessor thread identification information [predecessor [thread]] 551. Likewise, [null] is set for the header information [head [p]] of the header 541.

It is determined in step S212 whether null is set for the header information [head [p]] of the header 541 of the processor-related data 540. If it is determined that null is set, no thread information is present in the thread list with the thread information 550 retired. In this case, null is set for the oldest entry time [oldest_time] of the processor-related data 540.

If it is determined in step S212 that null is not set for the header information [head [p]] of the header 541 of the processor-related data 540, thread information is present in the thread information even after the thread information 550 is retired. In this case, processing ends without rewriting the oldest entry time [oldest_time] of the processor-related data 540.

As shown in FIG. 12B, the thread information 550 to be processed in the retirement process is at a location other than the front of the thread list. In step S221, a variable [succ] is assumed to be a thread in immediate front of the retirement thread within the thread list. The front end of the list is a forward end herein. In other words, the immediately front thread corresponds to thread information 570 of FIG. 12B.

In step S222, predecessor thread identification information [predecessor [succ]] of the thread immediately preceding the retirement thread is updated as being predecessor thread identification information [predecessor [thread]] of the retirement thread. This process step corresponds to the setting of information specifying thread information 580 to the predecessor thread identification information of the thread information 570 as shown in FIG. 12B. If no preceding thread to the thread information 550 to be processed in the retirement process is present, null is set for predecessor thread identification information [predecessor [thread]] 551. Likewise, null is set for the predecessor thread identification information of the thread information 570.

It is determined in step S223 whether null is set for the predecessor thread identification information [predecessor [thread]] of the retirement thread. If it is determined that null is set, the retirement of the thread information 550 means the retirement of the thread having the oldest entry time. In this case, time [succ] is set for the oldest entry time [oldest_time] of the processor-related data 540, and processing ends. In other words, this process is performed when the thread information 580 of FIG. 12B is not present. Entry time 572 of the thread information 570 is set for the oldest entry time [oldest_time] of the processor-related data 540.

If it is determined in step S223 that null is not set for the predecessor thread identification information [predecessor [thread]] of the retirement thread, a thread having the entry time older than the thread information 550 to be processed in the retirement process, namely, the thread information 580 of FIG. 12B, is not present. Processing ends without rewriting the oldest entry time [oldest_time] of the processor-related data 540.

Figure 13:
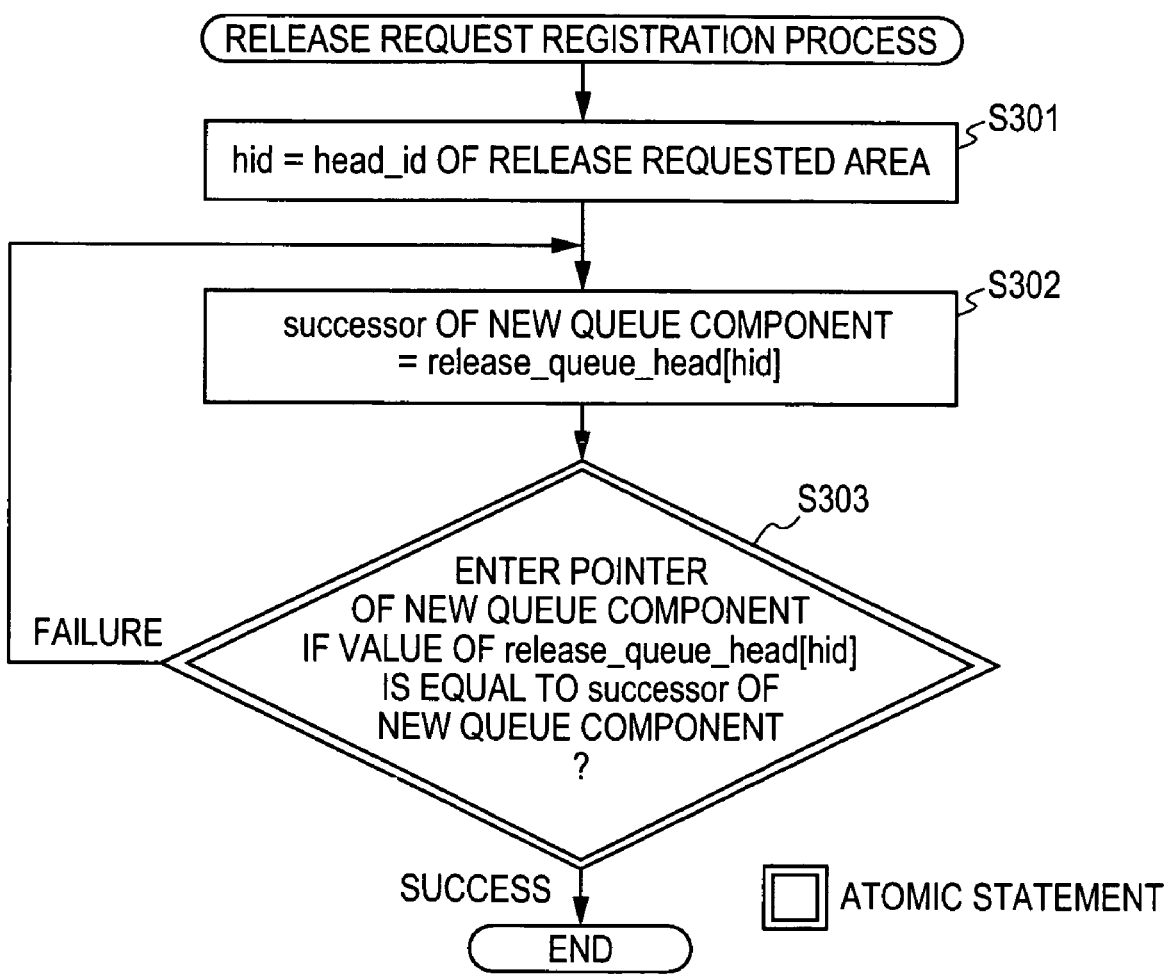
FIG. 13 is a flowchart illustrating the sequence of a memory area release request registration process executed by the memory area management unit in the information processing apparatus of the embodiment of the present invention.

The process of the memory area manager 313 is described below with reference to FIG. 13. The memory area manager 313 holds the release queue of FIG. 8 as the heap management information set on a per processor basis. The release queue is information of a memory area (heap), which is not yet released although the release thereof has been requested.

The memory area manager 313 executes a release request registration process of the memory area (heap). The release request registration process of the memory area is executed to add a new queue to the release queue described with reference to FIG. 8. The memory area allocation process is executed to allocate the memory area to the thread. A queue is deleted from the release queue as required.

The release request registration process of the memory area is described below with reference to a flowchart of FIG. 13. In step S301, a heap ID [hid] of a queue component set as a new queue to the release queue is set as a heap identifier of the release-requested memory area. As previously discussed, the release queue as the management information of the memory area is set for each heap corresponding to a processor. The memory area manager 313 releases and allocates the memory area on a per heap basis. The memory area manager 313 sets a release-requested heap ID as a heap ID of the queue to be added to the release queue.

In step S302, a release queue header [release_queue_head [hid]] is set for subsequent queue information [successor] of the new queue component. If it is determined in step S303 that the value of the release queue header [release_queue_head [hid]] is set to be equal to the subsequent queue information [successor] of the release area, pointer information of the new queue component is input to the release queue header [release_queue_head [hid]], and a variety of information, such as memory area information, is set in the queue. Processing thus ends.

If it is determined in step S303 that the value of the release queue header [release queue_head [hid]] is not equal to the subsequent queue information [successor] of the release area, processing returns to step S302 to repeat steps S302 and S303. After checking that the value of the release queue header [release_queue_head [hid]] is equal to the subsequent queue information [successor] of the release area, a variety of information, such as memory area information, is set to the queue. Processing thus ends.

The determination in step S303 that the value of the release queue header [release queue_head [hid]] is not equal to the subsequent queue information [successor] of the release area is reached when another queue setting process is concurrently performed by another processor with the subsequent queue information [successor] of the release area rewritten.

A new queue is set in the release queue in response to the determination in step S303 that the value of the release queue header [release_queue_head [hid]] is equal to the subsequent queue information [successor] of the release area. The memory area corresponding to the process is reliably reserved.

Figure 14:
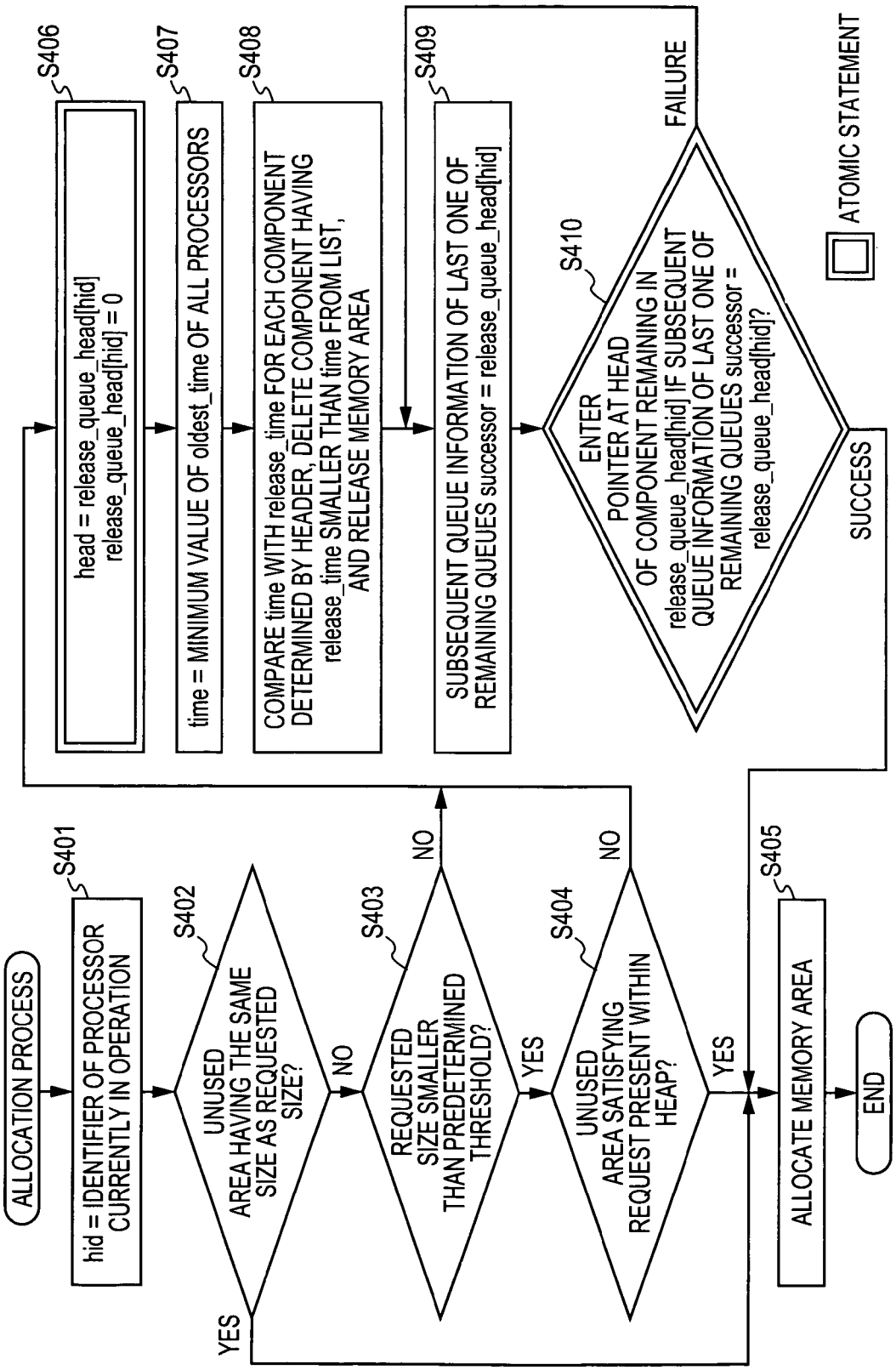
FIG. 14 is a flowchart illustrating in detail a memory area allocation process executed by the memory area management unit in the information processing apparatus of the embodiment of the present invention.

The sequence of the memory area (heap) allocation process of the memory area manager 313 is described below with reference to FIG. 14. In step S401, a variable [hid] is set to be equal to the identifier of the processor executing the memory area allocation. The memory area allocation process is performed on a per processor basis. A processor to be memory-area allocated is identified first.

It is determined in step S402 whether an unused memory area equal to the same size as the allocation-requested memory area is present in the memory. More specifically, the memory area manager 313 checks whether the unused area having the same size as the memory area size required by the thread is present in the memory. If it is determined that the memory area is available, processing proceeds to step S405. The memory area manager 313 allocates the memory area as a data processing memory area of the thread corresponding to the processor having the identifier set in step S401.

If it is determined in step S402 that the unused memory of the same size as the allocation-requested memory area size is not available from the memory, processing proceeds to step S403. The memory area manager 313 determines in step S403 whether the allocation-requested memory area size is smaller than a predetermined threshold. If it is determined that the allocation-requested memory area size is smaller than the predetermined threshold, processing proceeds to step S404. The memory area manager 313 determines in step S404 whether an unused memory area satisfying the allocation-requested memory area size is present in a heap area. If it is determined that the unused memory area satisfying the allocation-requested memory area size is present in the heap area, the memory area manager 313 performs an allocation process of the memory area set as an unused heap area in step S405. This process step is carried out if the requested memory size is smaller than the predetermined threshold and satisfied with the allocation of only the unused heap area.

If it is determined in step S403 that the allocation-requested memory area size is not smaller than the predetermined threshold, or if it is determined in step S404 that the unused area satisfying the allocation-requested memory area size is not present in the heap area, subsequent to the determination in step S403 that the allocation-requested memory area size is smaller than the predetermined threshold, steps S406 and subsequent steps are performed to allocate the memory area. The process step in step S406 is performed by referencing the release queue and the thread list.

In step S406, a variable [head] is set as the release queue header [release_queue_head [hid]] and null is set for the release queue header [release_queue_head [hid]].

In step S407, a variable [time] is set to a minimum of the oldest entry times set in the thread list corresponding to all processors.

In step S408, the memory area manager 313 compares the release request time [release_time] set in each component traced from each header with a minimum of the oldest entry time set in the thread list corresponding to all processors having the time [time] set in step S407, and selects only the request release time [release_time] smaller than the value [time]. The memory area manager 313 deletes the selected request release time [release_time] from the release queue, releases the memory areas corresponding to these queues, and allocates the released memory areas to the memory requesting thread.

It is guaranteed that the memory area release-requested prior to the minimum of the oldest entry times of all processors is not an access target from all threads. By selecting, releasing and then allocating the memory area, the memory area allocation process is safely performed.

In step S409, the subsequent queue information [successor] of the end of the remaining queues other than the queues deleted from the release queues is set for the release queue header [release_queue_head [hid]]. If it is determined in step S410 that the value of the release queue header [release_queue_head [hid]] is set to be equal to the subsequent queue information [successor] of the end queue, a pointer for a front queue of the remaining queues other than the queues deleted from the release queues is set for the release queue header [release_queue_head [hid]] in step S408.

If it is determined in step S410 that the value of the release queue header [release_queue_head [hid]] is not set to be equal to the subsequent queue information [successor] of the end queue, processing returns to step S409 to repeat steps S409 and S410. After checking that the value of the release queue header [release_queue_head [hid]] is set to be equal to the subsequent queue information [successor] of the end queue, the memory area manager 313 sets a variety of information, such as the memory area information, to the queue.

The determination in step S410 that the value of the release queue header [release_queue_head [hid]] is not set to be equal to the subsequent queue information [successor] of the end queue results when another queue setting and deletion process is performed by another processor with the subsequent queue information [successor] rewritten.

The memory area manager 313 selects only the request release time [release_time] set for each component in the release queue smaller than a minimum of the oldest entry times set in the thread list corresponding to all processors. The memory area manager 313 deletes the selected queues from the release queues, releases the memory areas corresponding to the queues, and allocates the memory areas to the memory requesting thread. Only the memory area that is not set as an access target for all threads is reliably selected for the memory allocation process. The memory area allocation process is thus performed to each thread in a manner free from access error.

A memory management process for supporting of the application a weak pointer is described below. The structure of the release queue held by the memory area manager 313 has been discussed with reference to FIG. 8. The release queue is set as a concatenation list of the header information [release_queue_head] 451 and the queue component 460. The queue component 460 contains the heap identifier [head_id] 461, the release request time [release_time] 462, the subsequent queue information [successor] 463, and the memory area information 464.

The heap identifier [heap_id] 461 is heap identification information of the memory area set corresponding to each processor. The release request time 462 indicates time at which head request is issued, namely, time at which the thread issues a use request of heap. The subsequent queue information 463 is a pointer to a subsequent queue in the release queue. The memory area information 464 is access information to the memory area available to the processor corresponding to the heap identifier 461.

The header information 451 contains the heap identifier (heap_id), and is set as information containing the pointer information of the front queue. As shown, all queue components are acquired by tracing the subsequent queue information 463 of each queue component from the header information 451.

Available processors are allocated to each thread in a resource allocation process, a heap area corresponding to each processor is identified, and the thread is on standby waiting to be executed. At this point of time, a queue component is set in the release queue corresponding to the allocated processor.

The release queue discussed with reference to FIG. 8 is stored as the memory area management information. To allocate the memory area, the release request time set for each component of the queue in the release queue is compared with the oldest entry time in the thread list. The memory area allocation process is performed on the queue component with the release request time set prior to the oldest entry time, and is thus reliably performed to the memory area that is not set as an access target in all threads. The memory area allocation process is thus performed in each thread in a manner free from access error.

The value of a reference counter (rf) can be used to determine whether the memory area is accessible. The reference counter is set for each heap (memory area). If the count of the reference counter is 1 or larger, the heap can be referenced. In other words, a thread referencing the heap is present.

To access the heap, a memory address is acquired from a pointer object holding address information of the heap. The acquired memory address is then set in a register. Accessing is then performed in accordance with the address set in the register. If another thread attempts to access memory in the middle of this process, memory information at the access destination can be updated from planned one. However, reliable memory accessing is performed by comparing the request release time set in the release queue discussed with reference to FIG. 8 with the oldest entry time of the thread list.

A weak pointer is one type of pointer objects. The weak pointer is a special pointer that increases the count of the above-mentioned reference counter set in response to the heap. Although the weak pointer references the heap as standard pointers do, the weak pointer is different from the standard pointers in that the count of the reference counter corresponding to the heap does not account for the weak pointer. Whether the reference counter is referenced or not cannot be determined based on the value of the reference counter. If the heap reference of the weak pointer is released, address information corresponding to the heap held by the weak pointer is updated to null (zero). More specifically, the weak pointer updates own pointer information to null without affecting the reference counter of the heap.

If the pointer information held by the weak pointer is acquired and stored in a register during the memory referencing, the information held by the weak pointer is immediately replaced with null. Subsequent memory accessing using the pointer information of the weak pointer can be performed no longer, and the pointer information of the weak pointer is missing. The modification of the release queue of FIG. 8 previously discussed cannot be performed smoothly. This problem is overcome as discussed below.

Figure 15:
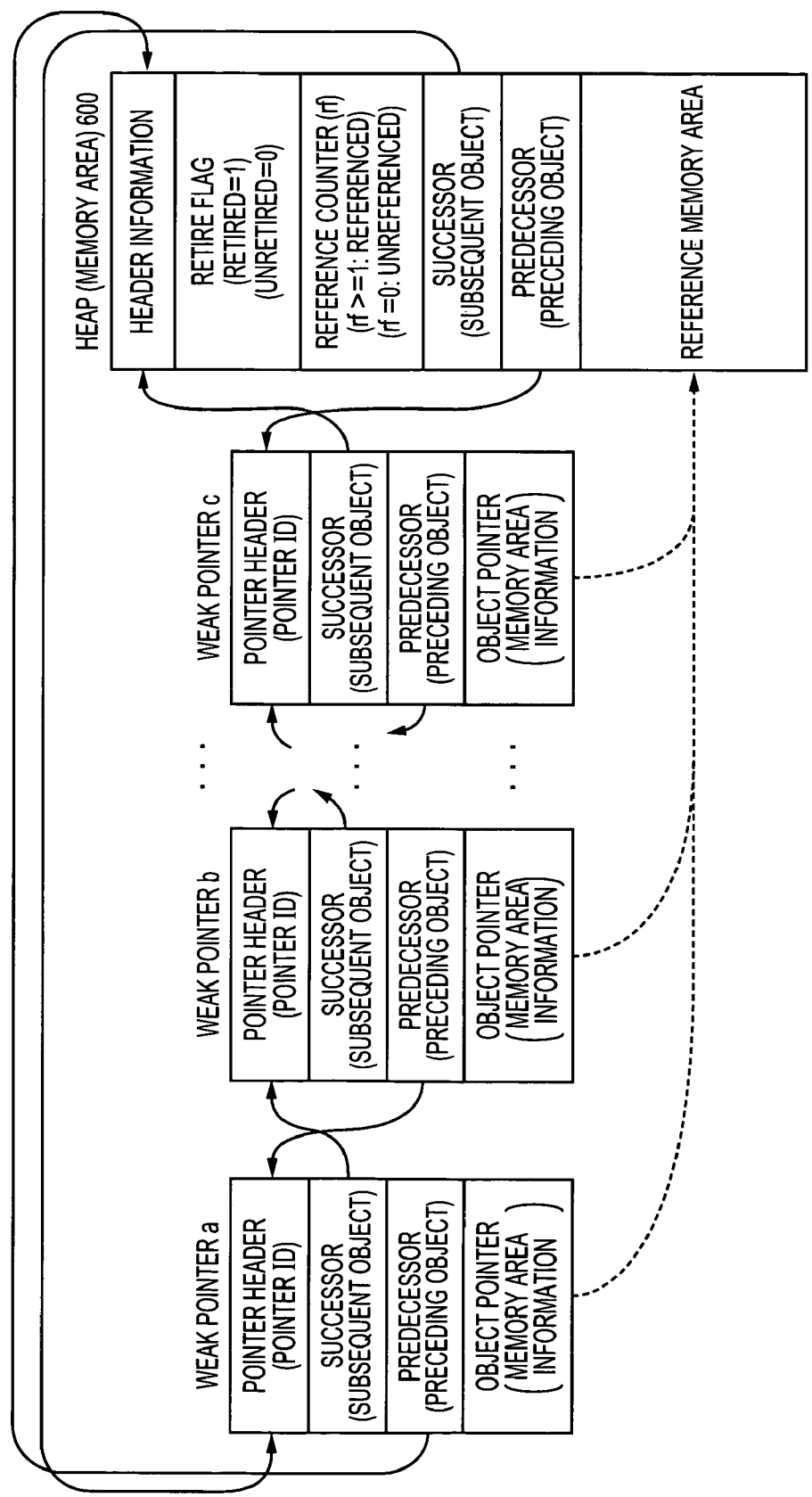
FIG. 15 illustrates the structure of a weak pointer and a weak pointer chain.

Reliable memory accessing and release queue updating using the weak pointer are described below with reference to FIG. 15. FIG. 15 illustrates a weak pointer and a heap (memory area) 600 having a reference memory area referenced by the weak pointer. The memory area information 464 of the queue component 460 in the release queue of FIG. 8 has the structure of a heap 600 of FIG. 15.

Weak pointers "a" through "n" reference the same reference memory area. As shown, each of the weak pointers "a" through "n" contains a pointer head including a pointer ID and a member variable as discussed as follows:

a) successor,
b) predecessor, and
c) object pointer.

The object pointer is an object member variable as memory area information to be referenced. A series of weak pointers "a" through "n" references the same reference memory area, and has the same object pointer.

The successor and the predecessor are pointer variables that chain the weak pointers having the same reference memory area to the heap having the reference memory area referenced by the weak pointer. The successor is identification information of one of a weak pointer and a heap as a subsequent object. The predecessor is identification information of one of a weak pointer and a heap as a preceding object.

The successor and the predecessor are set in the weak pointer having the same reference memory area and the heap having the reference memory area referenced by the weak pointer. A two-way link, namely, a chain is constructed to mutually connect a series of weak pointers and heaps. Such a chain is referred to as a weak pointer chain.

Information concerning a retirement flag and a reference counter is set in the heap. As previously discussed, the reference counter has a value responsive to a reference environment of the memory area. The reference counter does not account for reference information relating to the weak pointer but that of the pointers other than the weak pointer. The retirement flag is used to determine whether the reference counter is not referenced by the pointers including the weak pointer, in other words, whether the thread is retired. The retirement flag is set to "1" if the thread is retired, and set to "0" if the thread is unretired. In an initialization flag allocating a new memory, the retirement flag is set to "0".

Figure 16:
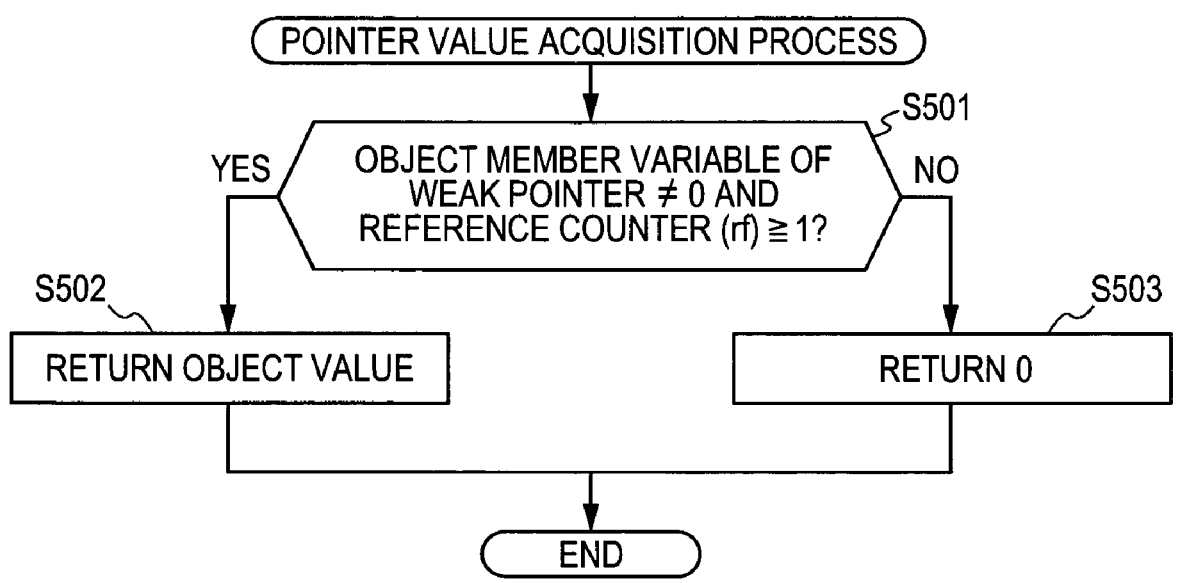
FIG. 16 is a flowchart illustrating a pointer value acquisition process of acquiring a value from the weak pointer.

The weak pointer chain is thus constructed. A pointer value is acquired from the weak pointer. More specifically, an object pointer as an object member variable corresponding to an address required to reference the reference memory area is acquired. The acquisition process is described below with reference to a flowchart of FIG. 16.

It is determined in step S501 in the acquisition process of the pointer value from the weak pointer whether the following first and second conditions are satisfied. The first condition is that the object pointer of the weak pointer, namely, the object member variable is non-zero. The second condition is that the value of the reference counter (rf) set in the heap linked by the weak pointer chain is equal to or greater than 1.

If it is determined that the two conditions are satisfied, processing proceeds to step S502. The object pointer as the object member variable corresponding to the address required to reference the reference memory area set in the weak pointer is then returned. If it is determined that the two conditions are not satisfied, processing proceeds to step S503 to return "0".

If it is determined that the object pointer of the weak pointer, namely, the object member variable is zero, or if it is determined that the count of the reference counter (rf) set in the heap linked by the weak pointer chain is zero, zero is returned in step S503. If the count of the reference counter is zero, referencing is not performed by the pointers other than the weak pointer. However, whether referencing is performed by the weak pointer cannot be determined. If the pointer value is acquired from the weak pointer, the object pointer of the weak pointer is set to zero. Memory accessing using the pointer information of the weak pointer can be performed no longer. With the pointer information of the weak pointer missing, the updating of the release queue cannot be smoothly updated. To preclude this problem, the pointer value is not acquired under this condition.

A flush process of the release queue is described below with reference to FIG. 17. The release queue has been discussed with reference to FIG. 8, and is managed by the memory area manager 313. As previously discussed, in the object-oriented memory management process, the resource is handled as an object, and the memory management is performed based on the memory area having a finite size called heap. The element managing the allocation of the object to the heap is the memory area manager 313. The memory area manager 313 efficiently allocates the memory area (heap) to each thread requesting heap while appropriately releasing the finite heap.

The memory area manager 313 holds heap management information set on a per processor basis. In other words, the number of heap management information units equals the number of processors. The heap management information contains a release queue of FIG. 8. The release queue is information of a memory area (heap), which is not yet released although the release thereof has been requested.

A special process is performed in the flushing of the release queue, namely, the updating process in the arrangement containing the weak pointer. The release queue flush process is described below with reference to a flowchart of FIG. 17. The process of FIG. 17 is successively performed on all objects (release queue components) contained in the release queue.

In step S601, the release queue is emptied. More specifically, the front queue of the header information 451 of FIG. 8 is emptied, and the queue is disconnected.

In step S602, the release time of the object (release queue component) set in the release queue to be processed, namely, the request release time "release_time" is compared with the oldest entry time set in the thread list corresponding to the processor. If it is determined that the request release time "release_time" is smaller than the oldest entry time, processing proceeds to step S603.

It is determined in step S603 whether one of the following conditions (a) and (b) are satisfied. The condition (a) is that the retirement flag set in the heap identified by the heap ID of the object (release queue component) to be processed is set to be a retired state. The condition (b) is that no weak pointer is present in the weak pointer chain set corresponding to the heap, in other words, that the weak pointer chain is empty.

If one of the above-referenced conditions (a) and (b) is satisfied, processing proceeds to step S604. The object is broken. In other words, the memory area corresponding to the object set in the release queue is released and the object is deleted from the release queue.

If it is determined in step S603 that none of the conditions (a) and (b) is satisfied, processing proceeds to step S621. The value of the object pointer as the object member variable of the weak pointer contained in the weak pointer chain set corresponding to the heap is set to zero. In step S622, the retirement flag is set to "1". In step S623, present time is entered for the release time of the object set at the release queue, namely, the request release time "release_time". In step S624, the object is set again to the release queue.

If it is determined in step S602 that the release time of the object (release queue component) set in the release queue to be processed, namely, the request release time "release_time" is not smaller than the oldest entry time set in the thread list corresponding to the processor, processing proceeds to step S611. It is determined in step S611 whether the reference counter set at the heap identified by the heap ID of the object is zero. If it is determined that the reference counter is zero, processing proceeds to step S624. The object is again set to the release queue.

Figure 17:
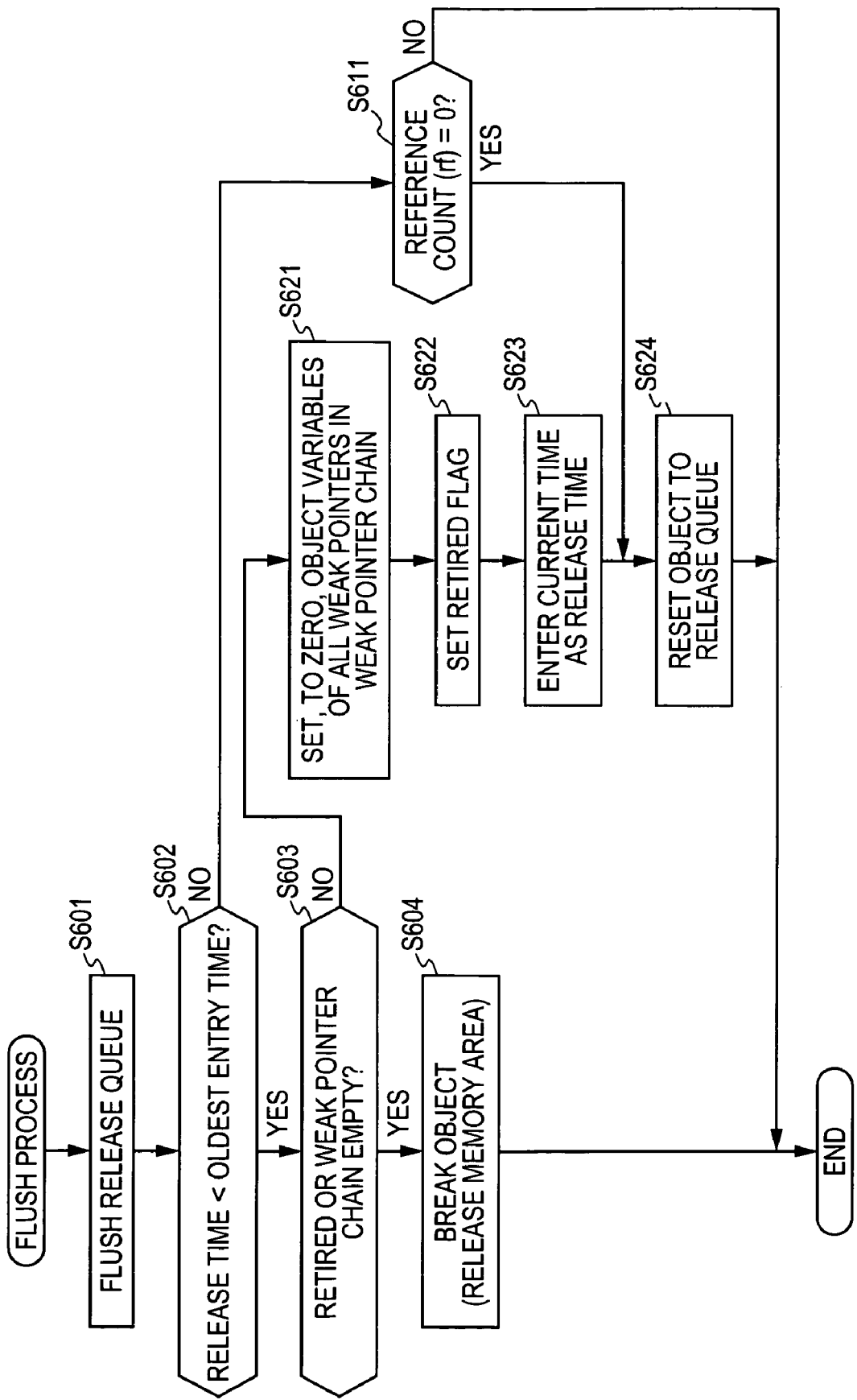
FIG. 17 is a flowchart illustrating a release queue process (flush process) sequence in the structure containing the weak pointer.

The process of FIG. 17 is performed by the memory area manager 313 in the OS 310 of FIG. 3. In the arrangement with the weak pointer contained as a pointer referencing the memory area, the memory area manager 313 examines the weak pointer referencing the memory area corresponding to the queue component contained in the release queue and the weak pointer chain composed of the memory area containing the reference area of the weak pointer. If the memory area manager 313 determines that no weak pointer is contained in the weak pointer chain, or that the retirement flag of the memory area contained in the weak pointer chain is set to a retired state, the queue component is broken from the release queue, and the memory area corresponding to the queue component is released.

The process of FIG. 17 is also executed for the object (release queue component) set in the release queue. With this flush process performed in the arrangement incorporating the weak pointer, the release queue is reliably updated, the request release time set in the release queue is reliably compared with the oldest entry time of the thread list, and memory accessing is performed in an error free manner.

The above-references series of steps can be performed by software, hardware, or a combination thereof. If the series of steps is performed by software, a program forming the software is installed from a recording medium or via a network onto a computer incorporated into a hardware structure or to a general-purpose computer, for example.

The program can be recorded beforehand onto one of a hard disk and a read-only memory (ROM) as a recording medium. The program can also be recorded on a removable recording media temporarily or permanently. The recording media includes a floppy disk, a compact disk read-only memory (CD-ROM), a magneto-optic (MO) disk, a digital versatile disk (DVD), a magnetic disk, a semiconductor memory, etc. Such a removable medium can be supplied in package software.

The program can be installed from the removable recording medium to the computer. The program can be transmitted in a wireless fashion to the computer from a download site. The program can also be transmitted in a wired fashion via a network such as one of a local area network (LAN) and the Internet. The program is then received by the computer and installed onto a recording medium such as a hard disk in the computer.

The process steps discussed in this specification are sequentially performed in the time series order as stated. Alternatively, the steps may be performed in parallel or separately. In this specification, the system refers to a logical system composed of a plurality of apparatuses, and the elements of each apparatus are not necessarily contained in the same casing.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
a thread management unit storing thread management information including a thread list comprising first variables corresponding to a plurality of threads, the plurality of threads including a first thread that is generated at a first entry time when a first function is called to be executed by using the first thread, and a second thread that is generated at a second entry time when a second function is called to be executed by using the second thread,
wherein the first thread is generated at a time before the generation of the second thread, and
wherein the first variables include the first entry time and the second entry time, the first entry time being included in the first variables when the first thread is generated, and the second entry time being included in the first variables when the second thread is generated; and
a memory area management unit storing memory management information used to manage a memory area divided into heap units including a first heap unit requested for execution of the first function, the memory management information including a release queue containing a release request time indicating a time at which the first heap unit is scheduled to be released after execution of the first function,
wherein the second thread requests allocation of memory to execute the second function,
wherein the release request time is compared with an oldest entry time to determine availability of the first heap unit for execution of the second function, the oldest entry time corresponding to the first entry time and indicating an oldest time from entry times included in the first variables, and
wherein the first heap unit is released from execution of the first function and allocated to the second thread when a result of the comparison indicates that the release request time is a time prior to a time indicated by the oldest entry time.

2. The information processing apparatus according to claim 1, wherein the oldest entry time is included in a header of a second variable.

3. The information processing apparatus according to claim 2, wherein the memory area management unit references the oldest entry time included in the header and performs the comparison by referencing to the header.

4. The information processing apparatus according to claim 1, wherein the first variables include thread identifiers identifying the plurality of threads.

5. The information processing apparatus according to claim 1, wherein the memory management information includes a list including heap identifiers identifying the heap units.

6. The information processing apparatus according to claim 1, wherein the memory area is divided into heap units to assign heap units to corresponding processors allocated to the plurality of threads.

7. The information processing apparatus according to claim 1, wherein the memory management information includes a chain of queue components corresponding to the heap units, one of the queue components being linked to a second queue component in the chain by a weak pointer included in the one queue component.

8. The information processing apparatus according to claim 7, wherein the chain of queue components is broken based on a retirement flag included in the one queue component.

9. A method for managing a memory area, the method being executed by an information processing apparatus and comprising:
storing, in a thread management unit of the information processing apparatus, thread management information;
including, in the thread management information, a thread list comprising first variables corresponding to a plurality of threads, the plurality of threads including a first thread that is generated at a first entry time when a first function is called to be executed by using the first thread, and a second thread that is generated at a second entry time when a second function is called to be executed by using the second thread,
wherein the first thread is generated at a time before the generation of the second thread, and
wherein the first variables include the first entry time and the second entry time, the first entry time being included in the first variables when the first thread is generated, and the second entry time being included in the first variables when the second thread is generated; and
storing, in a memory area management unit of the information processing apparatus, memory management information used to manage a memory area divided into heap units including a first heap unit requested for execution of the first function, the memory management information including a release queue containing a release request time indicating a time at which the first heap unit is scheduled to be released after execution of the first function, requesting allocation of memory to execute the second function;

comparing the release request time with an oldest entry time to determine availability of the first heap unit for execution of the second function, the oldest entry time corresponding to the first entry time and indicating an oldest time from entry times included in the first variables;

releasing the first heap unit from execution of the first function; and allocating the first heap unit to the second thread when a result of the comparison indicates that the release request time is a time prior to a time indicated by the oldest entry time.

10. The method according to claim 9, wherein the oldest entry time is included in a header of a second variable.

11. The method according to claim 10, further comprising:
referencing the oldest entry time included in the header; and
performing the comparison by referencing to the header.

12. The method according to claim 9, wherein the first variables include thread identifiers identifying the plurality of threads.

13. The method according to claim 9, further comprising:
storing, in the memory management information a list including heap identifiers identifying the heap units.

14. The method according to claim 9, further comprising:
assigning the heap units to assign corresponding processors allocated to the plurality of threads.

15. The method according to claim 9, further comprising:
including, in the memory management information, a chain of queue components corresponding to the heap units, one of the queue components being linked to a second queue component in the chain by a weak pointer included in the one queue component.

16. The method according to claim 15, further comprising:
breaking the chain of queue components based on a retirement flag included in the one queue component.

17. A recording medium storing a computer program that, when executed on a processor, causes the processor to perform a method for managing a memory area, the method comprising:

storing thread management information including a thread list comprising first variables corresponding to a plurality of threads, the plurality of threads including a first thread that is generated at a first entry time when a first function is called to be executed by using the first thread, and a second thread that is generated at a second entry time when a second function is called to be executed by using the second thread, wherein the first thread is generated at a time before the generation of the second thread, and wherein the first variables include the first entry time and the second entry time, the first entry time being included in the first variables when the first thread is generated, and the second entry time being included in the first variables when the second thread is generated; and storing memory management information used to manage a memory area divided into heap units including a first heap unit requested for execution of the first function, the memory management information including a release queue containing a release request time indicating a time at which the first heap unit is scheduled to be released after execution of the first function, requesting allocation of memory to execute the second function;

comparing the release request time with an oldest entry time to determine availability of the first heap unit for execution of the second function, the oldest entry time corresponding to the first entry time and indicating an oldest time from entry times included in the first variables;

releasing the first heap unit from execution of the first function; and allocating the first heap unit to the second thread when a result of the comparison indicates that the release request time is a time prior to a time indicated by the oldest entry time.

* * * * *